United States Patent
Gotoh

(10) Patent No.: US 7,602,686 B2
(45) Date of Patent: Oct. 13, 2009

(54) INFORMATION RECORDING MEDIUM, METHOD FOR SIMULTANEOUS RECORDING AND REPRODUCTION, AND INFORMATION RECORDING AND REPRODUCTION APPARATUS

(75) Inventor: Yoshiho Gotoh, Osaka (JP)

(73) Assignee: Panasonic Corporation, Kadoma (JP)

( * ) Notice: Subject to any disclaimer, the term of this patent is extended or adjusted under 35 U.S.C. 154(b) by 749 days.

(21) Appl. No.: 10/966,016

(22) Filed: Oct. 15, 2004

(65) Prior Publication Data

US 2005/0083817 A1    Apr. 21, 2005

(30) Foreign Application Priority Data

Oct. 17, 2003  (JP)  ............................. 2003-357726
Feb. 3, 2004   (JP)  ............................. 2004-027337

(51) Int. Cl.
*G11B 27/36* (2006.01)

(52) U.S. Cl. .............. 369/53.24; 369/59.25; 369/30.12; 369/275.3

(58) Field of Classification Search .............. 369/53.24, 369/53.37, 59.25, 53.16, 275.3, 47.14
See application file for complete search history.

(56) References Cited

U.S. PATENT DOCUMENTS 5,819,290 A * 10/1998 Fujita .............................. 707/2
6,553,177 B1 * 4/2003 Shimizu et al. ................ 386/68
7,330,412 B2 * 2/2008 Harada et al. ............. 369/53.24

* cited by examiner

*Primary Examiner*—Thang V Tran
*Assistant Examiner*—Dionne H Pendleton
(74) *Attorney, Agent, or Firm*—Renner, Otto, Boisselle & Sklar, LLP

(57) ABSTRACT

A simultaneous recording and reproduction method for recording a first real time data in an information recording medium while reproducing a second real time data recorded in the information recording medium, including the steps of: searching for unallocated areas on the information recording medium and allocating at least one unallocated area, each having a size which is greater than or equal to a minimum size Y, as an area in which the first real time data is to be recorded: selecting at least one area in which each area includes a non-used area having a size which is less than or equal to K from among the allocated at least one area, wherein K denotes the size of non-used area which is allowed within a window having the same size as the minimum size Y: recording the first real time data in the selected at least one area; and reading the second real time data from at least one area in which the second real time data has been recorded, whereby each of the at least one area has a size which is greater than equal to the minimum size Y, wherein the minimum size Y is determined to enable the simultaneous recording and reproduction, even if the non-used area having a size of K exists in each of two adjacent areas where data is to be recorded during the recording operations immediately before and immediately after an access operation, or even if the non-used area having a size of K exists in each of two adjacent areas where data is to be read during the reproduction operations immediately before and immediately after an access operation.

3 Claims, 15 Drawing Sheets

INFORMATION RECORDING MEDIUM, METHOD FOR SIMULTANEOUS RECORDING AND REPRODUCTION, AND INFORMATION RECORDING AND REPRODUCTION APPARATUS

BACKGROUND OF THE INVENTION

1. Field of the Invention

The present invention relates to an information recording medium capable of simultaneous recording and reproduction of a plurality of real time data, a method for simultaneous recording and reproduction, and an information recording and reproduction apparatus.

2. Description of the Related Art

One exemplary information recording medium having a sector structure is an optical disc. Recently, the high density and the large capacity features of optical discs have been developed. It is highly desirable to have optical discs capable of recording/reproduction video data using high definition (HD) in addition to the standard definition. A method for simultaneous recording and reproduction called "skip reproduction" in the high definition is being reviewed.

Hereinafter, a method for simultaneous recording and reproduction will be described with reference to FIGS. 5 and 6.

FIG. 5 is a diagram showing a principle of a method for simultaneous recording and reproduction of a plurality of real time data in accordance with a simultaneous recording and reproduction model. FIG. 6 is a diagram showing a simultaneous recording and reproduction model for simultaneous recording and reproduction of two real time data.

The simultaneous recording and reproduction model includes a pickup 64 for recording/reproducing real time data for an information recording medium, an encoder 60 for encoding first real time data, a recording buffer 62 for temporarily storing the encoded first real time data before the first real time data is recorded by the pickup 64, a reproduction buffer 63 for temporarily storing second real time data which is reproduced by the pickup 64, and a decoder 61 for decoding the second real time data which is transferred from the reproduction buffer 63. Herein, "real time data" refers to data including at least one of video data and audio data. An "information recording medium" refers to any type of recording medium such as an optical disc.

FIG. 5 shows a transition of an amount of data in the recording buffer 62 and the reproduction buffer 63 in the simultaneous recording and reproduction model during simultaneous recording and reproduction of real time data A and B.

In the example shown in FIG. 5, while the real time data A is recorded in areas 1, 2, 3 and 4 of an information recording medium, real time data B recorded in areas 5, 6, 7 and 8 of the information recording medium is reproduced. The areas 1, 2, 3 and 4 are allocated as areas in which the real time data A is to be recorded. The areas 5, 6, 7 and 8 are allocated as areas having the real time data B recorded therein.

In FIG. 5, A1 through A7 refer to operations of the pickup 64 moving between areas to be accessed (access operations). It is assumed here that the time required for each of the access operations A1 through A7 is a time period required for the pickup 64 to move between an innermost area and an outermost area of the information recording medium (i.e., the maximum access time Ta). It is also assumed that the data transfer rate between the pickup 64 and the recording buffer 62 and the data transfer rate between the pickup 64 and the reproduction buffer 63 are a constant rate Vt. It is also assumed that the data transfer rate between the encoder 60 and the recording buffer 62 and the data transfer rate between the decoder 61 and the reproduction buffer 63 are a constant rate Vd. In the case where the data to be recorded and reproduced is compressed at a variable rate, Vd is the maximum value of the range in which the rate is variable.

In a recording operation W1, real time data A accumulated in the recording buffer 62 is recorded in the area 1. When the real time data A is recorded to the end of the area 1, the recording buffer 62 is not empty. Therefore, the recording operation of the real time data A is not switched to the reproduction operation of real time data B. After an access operation A1, in a recording operation W2, real time data A accumulated in the recording buffer 62 is recorded in the area 2.

While the recording operation W2 is being executed, the recording buffer 62 becomes empty. As a result, the recording operation of the real time data A is switched to the reproduction operation of the real time data B (access operation A2).

In a reproduction operation R1, the real time data B is read from the area 5 and accumulated in the reproduction buffer 63. When the data is reproduced from the end of the area 5, the reproduction buffer 63 is not full. Therefore, the reproduction operation of the real time data B is not switched to the recording operation of the real time data A. After an access operation A3, in a reproduction operation R2, the real time data B is read from the area 6 and accumulated in the reproduction buffer 63.

While the reproduction operation R2 is being executed, the reproduction buffer 63 becomes full. As a result, the reproduction operation of the real time data B is switched to the recording operation of the real time data A (access operation A4).

Thus, the method of simultaneous recording and reproduction is designed so as to fulfill both (i) the condition that the recording buffer 62 can be made empty by at most one access operation and at most two recording operations and (ii) the condition that the reproduction buffer 63 can be made full by at most one access operation and at most two reproduction operations. Namely, the condition for simultaneous recording and reproduction is to fulfill these two conditions. By fulfilling these two conditions, it is possible to ensure the real time data A is recorded on the information recording medium while reproducing the real time data B recorded on the information recording medium, without causing the recording buffer 62 and the reproduction buffer 63 to overflow, and without causing the recording buffer 62 and the reproduction buffer 63 to underflow.

For example, the above-mentioned condition for simultaneous recording and reproduction can be fulfilled where each of at least one area allocated as an area in which the real time data A is to be recorded has a size of Y or greater, and each of at least one area allocated as an area having the real time data B recorded therein has a size of Y or greater.

Accordingly, the condition for simultaneous recording and reproduction can be fulfilled by searching for at least one unallocated area having a size of Y or greater and allocating the at least one area thus found as an area in which the real time data A is to be recorded. The area for the real time data B is obtained in a similar manner.

In the example shown in FIG. 5, the condition for simultaneous recording and reproduction can be fulfilled where each of the areas 1, 2, 3 and 4 has a size of Y or greater, and each of the areas 5, 6, 7 and 8 has a size of Y or greater. The areas 2 and 3 are a continuous recording area, and the areas 6 and 7 are a continuous reproduction area.

The minimum size Y for each recording area and each reproduction area, and a buffer size B which is required for the recording buffer 62 and the reproduction buffer 63, are obtained by the following expressions.

$$Y = 4 \times Ta \times Vd \times Vt + (Vt - 2 \times Vd) \quad \text{Expression (1)}$$

$$B = (4 \times Ta + Y + Vt) \times Vd \quad \text{Expression (2)}$$

The expression for obtaining the minimum size Y for each recording area and each reproduction area is derived as follows.

During a recording operation of the real time data A, the data in the recording buffer 62 is consumed at the rate Vt−Vd. During an access operation and a reproduction operation of the real time data B, the data in the recording buffer 62 is accumulated at the rate Vd. The amount of data which is consumed from the recording buffer 62 during the recording operation W1, the access operation A1 and the recording operation W2 is equal to the amount of data accumulated in the recording buffer 62 during the access operation A2, the reproduction operation R1, the access operation A3, the reproduction operation R2 and the access operation A4. Accordingly, for simultaneous recording and reproduction of two pieces of real time data, the following expression is satisfied.

$$Y+Vt\times(Vt-Vd)-Ta\times Vd=(3\times Ta+Y+Vt)\times Vd \qquad \text{Expression (3)}$$

By modifying Expression (3), the above expression for obtaining the minimum size Y for each recording area and each reproduction area is obtained.

In an information recording medium such as an optical disc, a defective block may be formed during fabricating the optical disc, which is called an "initial defect". Further, a defective block may occur due to scratches and stains.

It is necessary to record data without any influence from such defective blocks. For example, a skip recording method is used to record video data onto the DVD-RAM disc. The skip recording method records real time data while avoiding defective blocks which are detected in advance or defective blocks which are detected during the recording operation (for example, see Japanese Patent No.3098237).

However, when skip recording is performed in the recording operation for simultaneous recording and reproduction, an appropriate condition is not considered. As a result, in a case where real time data is recorded using the skip recording method, due to a plurality of defective blocks, it is not possible to ensure continuous reproduction without any interruption. The present invention is made to solve such a problem.

SUMMARY OF THE INVENTION

A simultaneous recording and reproduction method is provided for recording a first real time data in an information recording medium while reproducing a second real time data recorded in the information recording medium. The method includes the steps of: searching for unallocated areas on the information recording medium and allocating at least one unallocated area, each having a size which is greater than or equal to a minimum size Y, as an area in which the first real time data is to be recorded; selecting at least one area in which each area includes a non-used area having a size which is less than or equal to K from among the allocated at least one area, wherein K denotes the size of non-used area which is allowed within a window having the same size as the minimum size Y; recording the first real time data in the selected at least one area and reading the second real time data from at least one area in which the second real time data has been recorded, whereby each of the at least one area has a size which is greater than equal to the minimum size Y, wherein the minimum size Y is determined to enable the simultaneous recording and reproduction, even if the non-used area having a size of K exists in each of two adjacent areas where data is to be recorded during the recording operations immediately before and immediately after an access operation, or even if the non-used area having a size of K exists in each of two adjacent areas where date is to be read during the reproduction operations immediately before and immediately after an access operation.

A simultaneous recording and reproduction method is provided for recording a first real time data in an information recording medium while reproducing a second real time data recorded in the information recording medium. The method includes the steps of: searching for unallocated areas on the information recording medium and allocating at least one unallocated area, each having a size which is greater than or equal to a minimum size Y, as an area in which the first real time data is to be recorded; selecting at least one area in which each area includes a non-used area having a size which is less than or equal to L from among the allocated at least one area, wherein L denotes the size of non-used area which is allowed within a scale having a size which is less than or equal to 1/N of the minimum size Y and N denotes an integer which is greater than or equal to two; recording the first real time data in the selected at least one area; and reading the second real time data from at least one area in which the second real time data has been recorded, whereby each of the at least one area has a size which is greater than or equal to the minimum size Y, wherein the minimum size Y is determined to enable the simultaneous recording and reproduction, even if the (N+1) number of non-used areas each having a size of L exists within two adjacent areas where data is to be recorded during the recording operations immediately before and immediately after an access operation, or even if the (N+1) number of non-used areas having a size of L exists within two adjacent areas where data is to be read during the reproduction operations immediately before and immediately after an access operation.

An information recoding and reproduction apparatus is provided for recording a first real time data in an information recording medium while reproducing a second real time data recorded in the information recording medium. The apparatus includes means for searching for unallocated areas on the information recording medium and allocating at least one unallocated area, each having a size which is greater than or equal to a minimum size Y, as an area in which the first real time data is to be recorded; means for selecting at least one area in which each area includes a non-used area having a size which is less than or equal to K from among the allocated at least one area, wherein K denotes the size of non-used area which is allowed within a window having the same size as the minimum size Y; means for recording the first real time data in the selected at least one area; and means for reading the second real time data from at least one area in which the second real time data has been recorded, whereby each of the at least one area has a size which is greater than equal to the minimum size Y, wherein the minimum size Y is determined to enable the simultaneous recording and reproduction, even if the non-used area having a size of K exists in each of two adjacent areas where data is to be recorded during the recording operations immediately before and immediately after an access operation, or even if the non-used area having a size of K exists in each of two adjacent areas where data is to be read during the reproduction operations immediately before and immediately after an access operation.

An information recoding and reproduction apparatus is provided for recording a first real time data in an information recording medium while reproducing a second real time data recorded in the information recording medium. The apparatus includes: means for searching for unallocated areas on the information recording medium and allocating at least one unallocated area, each having a size which is greater than or equal to a minimum size Y, as an area in which the first real time data is to be recorded; means for selecting at least one area in which each area includes a non-used area having a size which is less than or equal to L from among the allocated at least one area, wherein L denotes the size of non-used area which is allowed within a scale having a size which is less than or equal to 1/N of the minimum size Y and N denotes an integer which is greater than or equal to two; means for recording the first real time data in the selected at least one area; and means for reading the second real time data from at least one area in which the second real time data has been recorded, whereby each of the at least one area has a size which is greater than or equal to the minimum size Y, wherein the minimum size Y is determined to enable the simultaneous recording and reproduction, even if the (N+1) number of non-used areas each having a size of L exists within two adjacent areas where data is to be recorded during the recording operations immediately before and immediately after an access operation, or even if the (N+1) number of non-used areas having a size of L exists within two adjacent areas where data is to be read during the reproduction operations immediately before and immediately after an access operation.

An information recording medium has at least one area allocated as an area in which real time data is to be recorded, wherein each of the at least one area has a size which is greater than or equal to a minimum size Y; and wherein the minimum size Y is determined to enable the simultaneous recording and reproduction, even if the non-used area having a size of K exists in each of two adjacent areas where data is to be recorded during the recording operations immediately before and immediately after an access operation, or even if the non-used area having a size of K exists in each of two adjacent areas where data is to be read during the reproduction operations immediately before and immediately after an access operation, K denotes the size of non-used area which is allowed within a window having the same size as the minimum size Y.

An information recording medium has at least one area allocated as an area in which real time data is to be recorded, wherein each of the at least one area has a size which is greater than or equal to a minimum size Y; and wherein the minimum size Y is determined to enable the simultaneous recording and reproduction, even if the (N+1) number of non-used areas each having a size of L exists within two adjacent areas where data is to be recorded during the recording operations immediately before and immediately after an access operation, or even if the (N+1) number of non-used areas having a size of L exists within two adjacent areas where data is to be read during the reproduction operations immediately before and immediately after an access operation, L denotes the size of non-used area which is allowed within a scale having a size which is less than or equal to 1/N of the minimum size Y and N denotes an integer which is greater than or equal to two.

DESCRIPTION OF THE PREFERRED EMBODIMENTS

Hereinafter, embodiments of the present invention will be described by way of drawings.

Embodiment 1

Figure 1:
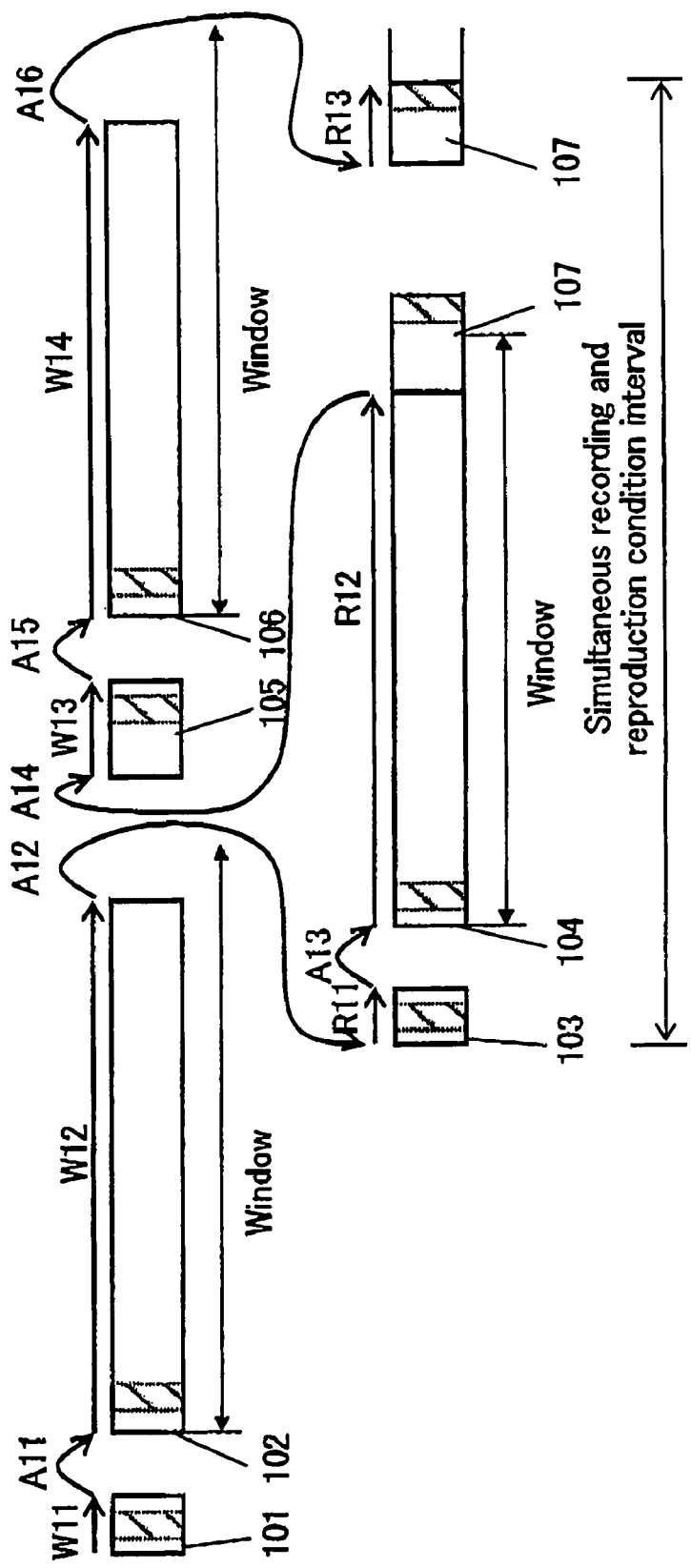
FIG. 1 is a diagram for illustrating a method of simultaneous recording and reproduction when the minimum size of the recording and reproduction area is the same as the minimum size of a window according to the present invention.

FIG. 1 is a diagram for illustrating a method of simultaneous recording and reproduction aAn information recording medium having at least one area allocated as an area in which real time data is to be recorded, ccording to an embodiment of the present invention.

Figure 6:
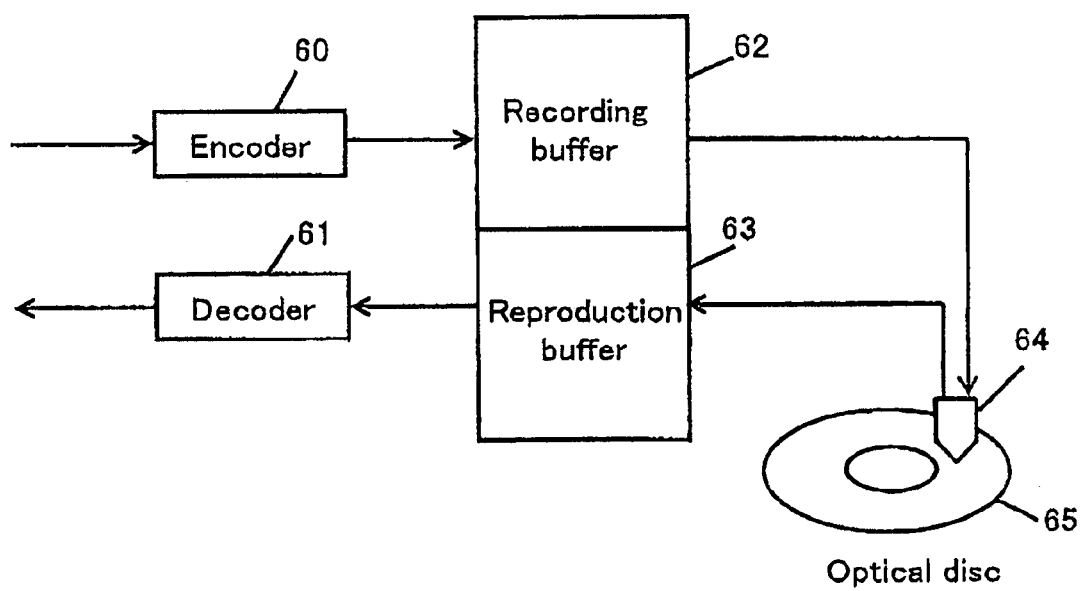
FIG. 6 is a diagram showing a simultaneous recording and reproduction model.

In the present specification, the term "simultaneous recording and reproduction" is defined as reproducing real time data B recorded on an information recording medium while recording real time data A onto the information recording medium. The method for simultaneous recording and reproduction is performed in accordance with the simultaneous recording and reproduction model shown in FIG. 6.

Herein, the term "real time data" is defined as data including at least one of video data and audio data. The term "information recording medium" is defined as any type of recording medium such as an optical disc.

In FIG. 1, W11, W12, W13 and W14 each denote a recording operation for an information recording medium; R11, R12 and R13 each denote a reproduction operation for the information recording medium; and A11, A12, A13, A14. A15 and A16 each denote an operation in which the pickup 64 (FIG. 6) moves between areas to be accessed (i.e. an access operation).

In the embodiment shown in FIG. 1, real time data B recorded in areas 103, 104 and 107 of the information recording medium is reproduced while real time data A is recorded in areas 101, 102, 105 and 106.

The areas 101, 102, 105 and 106 are allocated as areas in which real time data A is to be recorded. The areas 103, 104 and 107 are allocated as areas in which real time data B is to be recorded and then has been recorded. The areas 102 and 105 are continuous areas. The areas 104 and 107 are continuous areas. In FIG. 1, these areas are shown in separate locations in order to easily explain the access operation of the pickup 64.

In the following description, "an area allocated as an area in which real time data A is to be recorded" or "an area allocated as an area in which real time data B is to be recorded and then has been recorded" is referred to as "a recording/reproduction area".

The recording/reproduction area is a continuous area in the information recording medium. By setting the size of the recording/reproduction area to a size equal to or greater than the minimum size Y, the condition for simultaneous recording and reproduction can be satisfied.

The minimum size Y of the recording/reproduction area is determined to enable simultaneous recording and reproduction, even if the worst case where non-used areas (e.g. defective areas) are concentrated into the recording/reproduction areas where data is to be read during the reproduction operations immediately before and immediately after a certain access operation (or the recording/reproduction areas where data is to be recorded during the recording operations immediately before and immediately after a certain access operation) occurs.

Thus, the determination of the minimum size Y of the recording/reproduction area in view of the worst case makes it possible to perform simultaneous recording and reproduction in any case other than the worst case.

It will be described how to determine the minimum size Y of the recording/reproduction area in view of non-used areas in detail below.

Herein, it is assumed that the size of the non-used area which is allowed within a window is K, and that the size of the window is the same as the minimum size Y of the recording/reproduction area.

The term "non-used area" is defined as an area which is not used during the recording operation or the reproduction operation. For example, the pickup 64 (FIG. 6) passes through the non-used area or jumps over the non-used area so as to perform the recording operation or the reproduction operation from the subsequent area.

A typical example of the "non-used area" is a defective area (for example, one or more defective ECC blocks). However, the non-used area is not limited to such specific examples. For example, the non-used area may be an area in which data other than real time data has been recorded, or may be an area which is not used for some reason.

The term "window" is defined as a range of the recording/reproduction area in which non-used area having a predetermined size is allowed.

In the embodiment shown in FIG. 1, the simultaneous recording and reproduction condition interval is an interval from the start of the reproduction operation R11 to the end of the reproduction operation R13.

By satisfying the condition for the simultaneous recording and reproduction during the simultaneous recording and reproduction condition interval, the condition for the simultaneous recording and reproduction can also be satisfied during any interval other than the simultaneous recording and reproduction during the simultaneous recording and reproduction condition interval.

This is because the operation during the interval other than the simultaneous recording and reproduction condition interval is a repetition of the operation during the simultaneous recording and reproduction condition interval.

Figure 5:
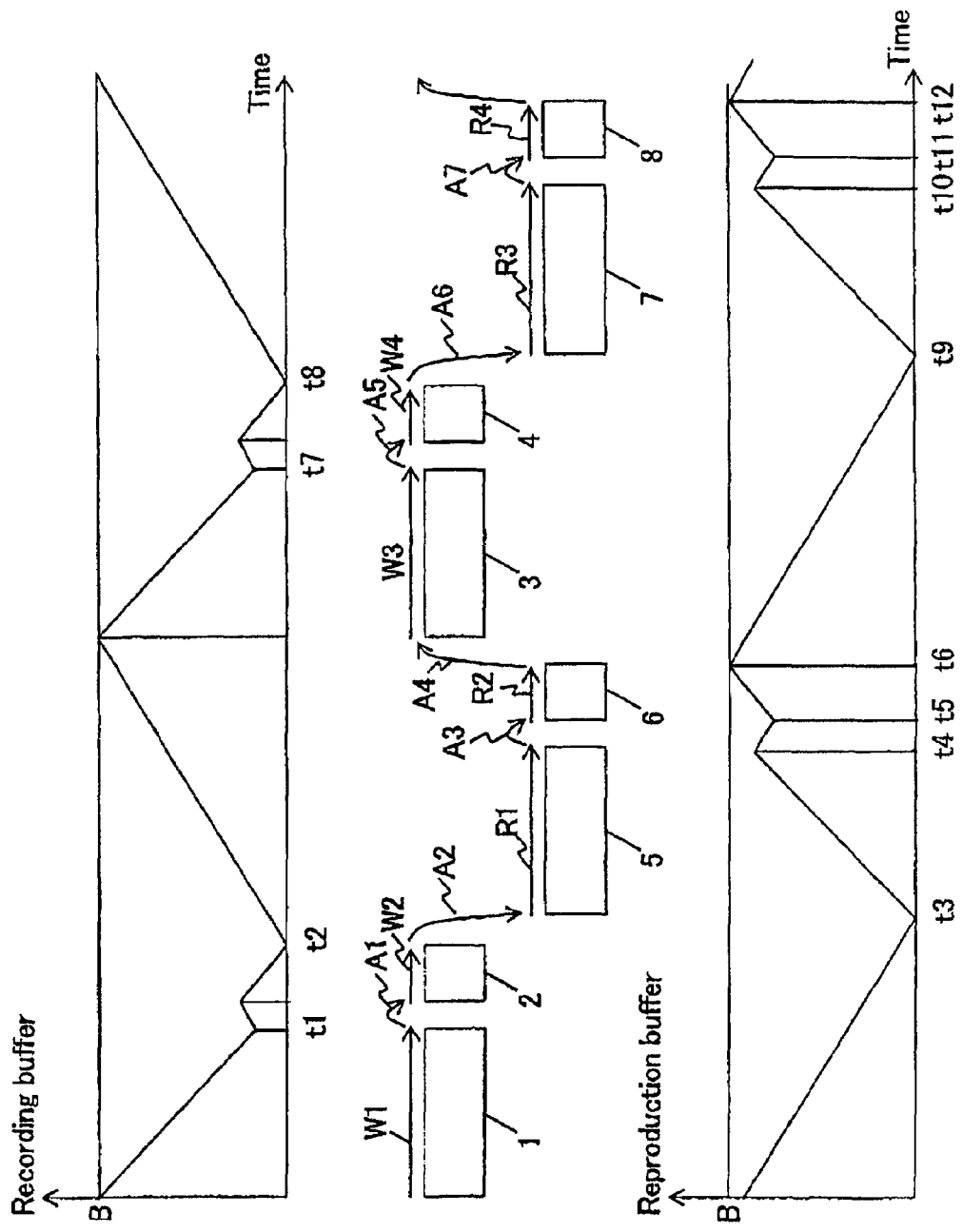
FIG. 5 is a diagram illustrating a principle of the simultaneous recording and reproduction.

The reason why the reproduction operation R13 is considered during the simultaneous recording and reproduction condition interval is as follows. After the access operation A16, the amount of data in the reproduction buffer 63 (FIG. 5) becomes close to empty. Accordingly, if there exists a non-used area (e.g. defective area) in the vicinity of the top of the area 107, there is a possibility of underflow occurring in the reproduction buffer 63 (although such a possibility is low). In order to avoid such an occurrence of underflow in the reproduction buffer 63, it is necessary to consider the reproduction operation R13 during the simultaneous recording and reproduction condition interval.

In FIG. 1, the non-used areas are shown as shaded portions of the recording/reproduction areas. In this example, it is assumed that the non-used area exists in each of the areas 103, 104, 105, 106 and 107, and that each of the non-used areas is a continuous area having a size K.

Further, it is assumed that the non-used area is located at a position which may be read during the reproduction operations immediately before and immediately after an access operation (e.g. a position which is apart from the end of the area 103 by one ECC block or a position which is apart from the top of the area 104 by one ECC block), or at a position which may be recorded during the recording operations immediately before and immediately after an access operation (e.g. a position which is apart from the end of the area 105 by one ECC block or a position which is apart from the top of the area 106 by one ECC block).

The reason why such locations of the non-used areas are assumed is to consider the worst case where the non-used areas are concentrated into the recording/reproduction areas where data is to be read during the reproduction operations immediately before and immediately after an access operation (or the recording/reproduction areas where data is to be recorded during the recording operations immediately before and immediately after an access operation).

During the simultaneous recording and reproduction condition interval, if time T1 in which video data can be reproduced continuously without any interruption is less than time T2 required for the recording operations, reproduction operations and access operations, then the video data cannot be reproduced continuously. Accordingly, in order to satisfy the condition for the simultaneous recording and reproduction, it is required that T1 =T2 .

$$(Y-2\times K+K+3\times Secc)/Vd=2\times Y/Vt+4\times Ta+2\times K/Vt+3\times Tecc \qquad \text{Expression (4)}$$

The left side of Expression (4) represents the time T1, whereas the right side of Expression (4) represents the time T2 . By modifying Expression (4), the minimum size Y of the recording/reproduction area can be obtained.

Y denotes the minimum size of the recording/reproduction area.

K denotes a size of the non-used area which is allowed within a window.

Secc denotes a size of one ECC block.

Vd denotes the maximum transfer rate of data to be recorded or reproduced.

Vt denotes a data recording rate or a data reproduction rate for an optical disc.

Ta denotes the maximum access time required for a full seek operation.

Tecc denotes the time required for reading one ECC block or the time required for recording one ECC block.

In the case of simultaneous recording and reproduction, it is necessary to consider the following two cases as the worst cases. One case is a case where the non-used area having size K exists in each of two adjacent recording/reproduction areas where data is to be read during the reproduction operations immediately before and immediately after an access operation. The other case is a case where the non-used area having size K exists in each of two adjacent recording/reproduction areas where data is to be recorded during the recording operations immediately before and immediately after an access operation. Herein, K denotes a size of the non-used area which is allowed within a window. This means that a size twice that of K should be considered in the case of the simultaneous recording and reproduction. Such a consideration is represented by the term (−2×K/Vd) on the left side of Expression (4).

In the case where the reproduction operation R12 is switched into the recording operation W13 and then the recording operation W14 is switched back into the reproduction operation R13, the influence of the non-used area on the time T1 is represented by the term (K+3×Secc)/Vd on the left side of Expression (4), and the influence of the non-used area on the time T2 is represented by the term (2×K/Vt+3×Tecc) on the right side of Expression (4).

In the case where the recording operation is switched back into the reproduction operation, since the influence of the non-used area on times T1 and T2 depends on the values of Vd and Vt, the values of (3×Secc)/Vd and 3×Tecc in Expression (4) are very small and hence negligible. Therefore, the left side of Expression (4) can be regarded as (K/Vd) and the right side of Expression (4) can be regarded as (2×K/Vt). For example, in the case where Vd=24 Mbps and Vt=72 Mbps, the left side of Expression (4) has a large value. Therefore, in this case, it is not necessary to consider the influence of the non-used area on times T1 and T2, even if the recording operation is switched back into the reproduction operation. In this case, the minimum size Y of the recording/reproduction area is given by the following Expression (5).

$$Y=(4\times Ta\times Vd\times Vt+2\times K\times Vt)/(Vt-2\times Vd) \quad \text{Expression (5)}$$

Expression (5) is obtained from the condition for the simultaneous recording and reproduction in the case where the simultaneous recording and reproduction condition interval is an interval from the start of the reproduction operation R11 to the end of the access operation A16 (i.e. the case where the reproduction operation R13 is not considered).

Thus, by introducing a window having the same size as the minimum size Y of the recording/reproduction area, the minimum size Y of the recording/reproduction area can be obtained in view of the worst case of the non-used areas which may exist within a window. By allocating a recording/reproduction area having a size equal to or greater than the minimum size Y as an area in which real time data is to be recorded, the condition for the simultaneous recording and reproduction can be satisfied.

In the embodiment shown in FIG. 1, the recording/reproduction area consisting of the area 104 and the area 107 has a size obtained by adding the size K of the non-used area which is allowed within a window and the size of one ECC block to the minimum size Y obtained in accordance with Expression (4).

Next, as a measure of a range allowable for the non-used area (e.g. defective area), a model in which a plurality of scales are set within the minimum size of the recording/reproduction area will be considered below.

Figure 2:
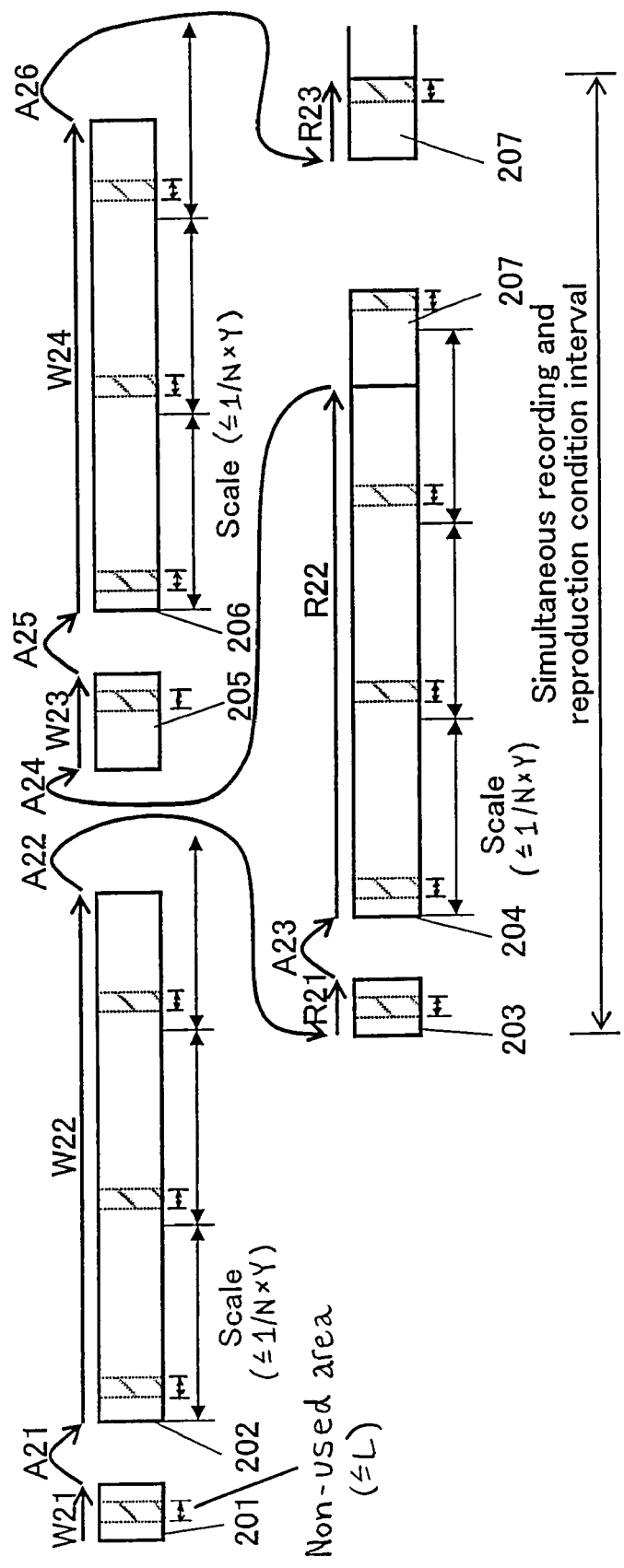
FIG. 2 is a diagram for illustrating conditions of simultaneous recording and reproduction when a plurality of scales are set in the minimum size of the recording and reproduction area according to the present invention.

FIG. 2 is a diagram illustrating a method for simultaneous recording and reproduction according to an embodiment of the present invention. This method for simultaneous recording and reproduction is performed in accordance with the simultaneous recording and reproduction model shown in FIG. 6.

In the embodiment shown in FIG. 2, a plurality of scales are set within the minimum size of the recording/reproduction area. The size of the non-used area which is allowed within one scale is predetermined.

In FIG. 2, W21, W22, W23 and W24 each denote a recording operation for an information recording medium; R21, R22 and R23 each denote a reproduction operation for the information recording medium; and A21, A22, A23, A24, A25 and A26 each denote an operation in which the pickup 64 (FIG. 6) moves between areas to be accessed (i.e. an access operation).

In the embodiment shown in FIG. 2, real time data B recorded in areas 203, 204 and 207 of the information recording medium is reproduced while real time data A is recorded in areas 201, 202, 205 and 206.

The areas 201, 202, 205 and 206 are allocated as areas in which real time data A is to be recorded. The areas 203, 204 and 207 are allocated as areas in which real time data B is to be recorded and then has been recorded. The areas 202 and 205 are continuous areas. The areas 204 and 207 are continuous areas. In FIG. 2, these areas are shown in separate locations in order to easily explain the access operation of the pickup 64.

It will be described how to determine the minimum size Y of the recording/reproduction area in view of non-used areas in detail below.

Herein, it is assumed that the size of a non-used area which is allowed within one scale is L, and that the size of each scale is equal to or less than 1/N of the minimum size Y of the recording/reproduction area. N is an arbitrary integer which is equal to or greater than 2.

The term "scale" is defined as a range of the recording/reproduction area in which a non-used area having a predetermined size is allowed.

In the embodiment shown in FIG. 2, the simultaneous recording and reproduction condition interval is an interval from the start of the reproduction operation R21 to the end of the reproduction operation R23.

By satisfying the condition for the simultaneous recording and reproduction during the simultaneous recording and reproduction condition interval, the condition for the simultaneous recording and reproduction can also be satisfied during any interval other than the simultaneous recording and reproduction during the simultaneous recording and reproduction condition interval.

This is because the operation during the interval other than the simultaneous recording and reproduction condition interval is a repetition of the operation during the simultaneous recording and reproduction condition interval.

The reason why the reproduction operation R23 is considered during the simultaneous recording and reproduction condition interval is as follows. After the access operation A26, the amount of data in the reproduction buffer 63 (FIG. 5) becomes close to empty. Accordingly, if there exists a non-used area (e.g. defective area) in the vicinity of the top of the area 207, there is a possibility of underflow occurring in the reproduction buffer 63 (although such a possibility is low). In order to avoid such an occurrence of underflow in the reproduction buffer 63, it is necessary to consider the reproduction operation R23 during the simultaneous recording and reproduction condition interval.

In FIG. 2, the non-used areas are shown as shaded portions of the recording/reproduction areas. In this example, it is assumed that the non-used area exists in each scale of the areas 203, 204, 205, 206 and 207, and that each of the non-used areas is a continuous area having a size L.

Further, it is assumed that the non-used area is located at a position which may be read during the reproduction operations immediately before and immediately after an access operation (e.g. a position which is apart from the end of the area 203 by one ECC block or a position which is apart from the top of the area 204 by one ECC block), or at a position which may be recorded during the recording operations immediately before and immediately after an access operation (e.g. a position which is apart from the end of the area 205 by one ECC block or a position which is apart from the top of the area 206 by one ECC block).

The reason why such locations of the non-used areas are assumed is to consider the worst case where the non-used areas are concentrated into the recording/reproduction areas where data is to be read during the reproduction operations immediately before and immediately after an access operation (or the recording/reproduction areas where data is to be recorded during the recording operations immediately before and immediately after an access operation).

During the simultaneous recording and reproduction condition interval, if time T1 in which video data can be reproduced continuously without any interruption is less than time T2 required for the recording operations, reproduction operations and access operations, then the video data cannot be reproduced continuously. Accordingly, in order to satisfy the condition for the simultaneous recording and reproduction, it is required that T1=T2.

$$(Y-(1+N)\times L+L+3\times Secc)/Vd-2\times Y/Vt+4\times Ta+2\times L/Vt+3\times Tecc \quad \text{Expression (6)}$$

The left side of Expression (6) represents the time T1, whereas the right side of Expression (6) represents the time T2. By modifying Expression (6), the minimum size Y of the recording/reproduction area can be obtained.

N denotes the number of scales included in the minimum size Y of the recording/reproduction area. N is an arbitrary integer which is greater than or equal to 2.

L denotes a size of the non-used area which is allowed within one scale.

The definitions of Y, Secc, Vd, Vt, Ta, Tecc are the same as those explained with respect to Expression (4).

In the case of simultaneous recording and reproduction, it is necessary to consider the following two cases as the worst cases. One case is a case where the (N+1) non-used areas, each having size L, exist within two adjacent recording/reproduction areas where data is to be read during the reproduction operations immediately before and immediately after an access operation. The other case is a case where the (N+1) non-used areas, each having size L, exist within two adjacent recording/reproduction areas where data is to be recorded during the recording operations immediately before and immediately after an access operation. Herein, L denotes a size of the non-used area which is allowed within one scale. This means that the size of (N+1) times L should be considered in the case of simultaneous recording and reproduction. Such a consideration is represented by the term $(-(1+N)\times L/Vd)$ on the left side of Expression (6).

When the minimum size of the recording/reproduction area is equal to the size of the window, the term which is considered for access between the recording/reproduction areas is the term $(-2\times K/Vd)$ on the left side of Expression (4). When it is assumed that the minimum size Y of the recording/reproduction area shown in FIG. 1 is equal to the minimum size Y of the recording/reproduction area shown in FIG. 2, it can be considered that N×L is equal to K. Accordingly, by setting the minimum size Y of the recording/reproduction area to a size which is greater than or equal to twice the size of the scale, the influence of the non-used area on the access between the recording/reproduction areas can be reduced.

Further, locally continuous non-used areas (e.g. defective blocks) can be prevented. For example, in the case where K=60, N=5 and L=12, the 60 continuous non-used areas (e.g. defective blocks) are allowed under the assumption that the minimum size Y of the recording/reproduction area is equal to the size of the window, whereas the allowable number of continuous non-used areas (e.g. defective blocks) is limited to 12 under the assumption that the minimum size Y of the recording/reproduction area is equal to five times the size of the scale. By providing such limitations, the influence of the non-used areas on the access between the recording/reproduction areas can be reduced.

In the case where the reproduction operation R22 is switched into the recording operation W23 and then the recording operation W24 is switched back into the reproduction operation R23, the influence of the non-used area on time T1 is represented by the term (L+3×Secc)/Vd on the left side of Expression (6), and the influence of the non-used area on time T2 is represented by the term (2×L/Vt+3×Tecc) on the right side of Expression (6).

In the case where the recording operation is switched back into the reproduction operation, the influence of the non-used area on times T1 and T2 depends on the values of Vd and Vt. Accordingly, there may be a case where it is not necessary to consider the influence of the non-used area on times T1 and T2 for particular values of Vd and Vt. In this case, the minimum size Y of the recording/reproduction area is given by the following Expression (7).

$$Y=(4\times Ta\times Vd\times Vt+(1+N)\times L\times Vt)/(Vt-2\times Vd) \quad \text{Expression (7)}$$

Expression (7) is obtained from the condition for the simultaneous recording and reproduction in the case where the simultaneous recording and reproduction condition interval is an interval from the start of the reproduction operation R21 to the end of the access operation A26 (i.e. the case where the reproduction operation R23 is not considered).

Thus, by introducing a scale having a size which is less than or equal to one half the minimum size Y of the recording/reproduction area, the minimum size Y of the recording/reproduction area can be obtained in view of the worst case of the non-used areas which may exist within a scale. The minimum size Y which is thus obtained can be smaller than the minimum size Y which is obtained in view of the worst case of the non-used areas which may exist within a window. By allocating a recording/reproduction area having a size greater than or equal to the minimum size Y as an area in which real time data is to be recorded, the condition for the simultaneous recording and reproduction can be satisfied.

In the embodiment shown in FIG. 2, the recording/reproduction area consisting of the area 204 and the area 207 has a size obtained by adding the size L of the non-used area which is allowed within a scale and the size of one ECC block to the minimum size Y obtained in accordance with Expression (6).

In the embodiments described above, the minimum size Y of the recording/reproduction area is set to an integer times the size of the scale. However, an integer times is not essential for the present invention. This is because it is apparent that an effect which is similar to the effect described above can be obtained by setting the minimum size Y of the recording/reproduction area to a size which is greater than or equal to twice the size of the scale.

The defective blocks which are allowed within the recording/reproduction area have been described. However, the non-used areas are not limited to the defective blocks. The condition described above can be considered as the condition for determining the minimum size of the recording/reproduction area for simultaneous recording and reproduction and the maximum size of the non-used area which is allowed within the recording/reproduction area.

In order to check the non-used area of the recording/reproduction area, several methods may be used. One method is a method for checking the non-used area while moving a scale for each ECC block. Another method is a method for checking whether the size of the non-used area which is allowed within a scale becomes less than or equal to a predetermined size while moving a scale for each distance which is one half the size of the scale. In this case, the number of times required to check the non-used area can be reduced for each scale.

Next, an information recording/reproduction apparatus and a method for simultaneous recording and reproduction according to an embodiment of the present invention will be described with reference to FIGS. 3 and 4.

Figure 3:
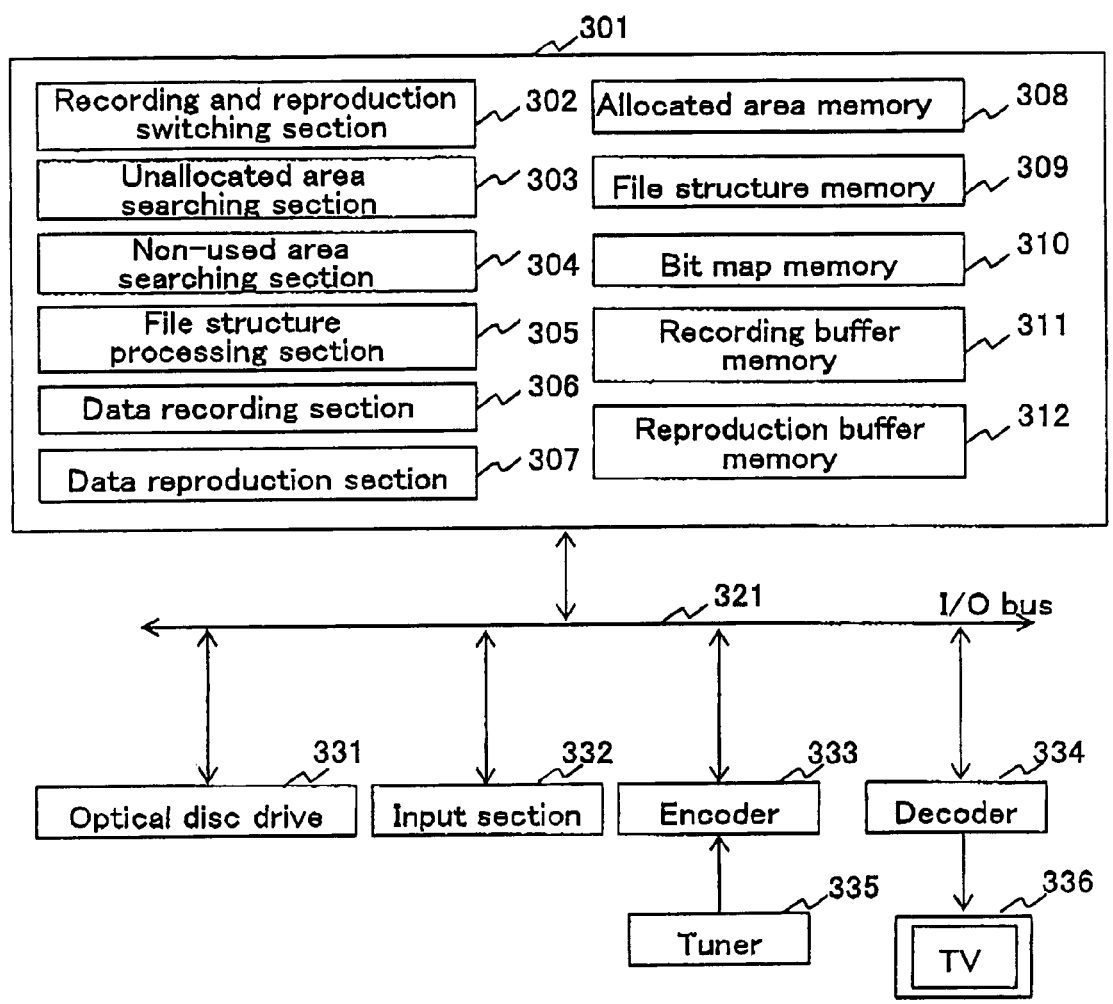
FIG. 3 is a diagram showing a structure of the recording/reproduction apparatus according to the present invention.

FIG. 3 is a diagram showing a structure of the information recording/reproduction apparatus according to an embodiment of the present invention.

The information recording/reproduction apparatus includes a system control section 301, an I/O bus 321, an optical disc drive 331, an input section 332 for designating a recording mode or instructing the start of simultaneous recording and reproduction, a tuner 335 for receiving TV broadcasting, an encoder 333 for encoding an audio/video signal selected by the tuner 335, a decoder 334 for decoding audio/video data, and a TV 336 for reproducing the audio/video signal.

The system control section 301 is implemented by, for example, a microcomputer and a memory device. The sections included in the system control section 301 are implemented by, for example, the microcomputer executing various programs. The memories included in the system control section 301 are implemented by, for example, areas of a single memory being used for different uses.

A recording and reproduction switching section 302 switches between a recording operation and a reproduction operation while checking the amount of data in the buffer memories.

An unallocated area searching section 303 searches for unallocated areas each having a size which is greater than or equal to the minimum size of the recording/reproduction area which satisfies the condition for the simultaneous recording and reproduction from unallocated areas.

A non-used area searching section 304 checks the size of the non-used areas included in the searched unallocated areas and selects one or more unallocated areas which satisfies the condition for simultaneous recording and reproduction.

A file structure processing section 305 reads file management information and analyzes a file structure.

A data recording section 306 instructs the optical disc drive 331 to record data.

A data reproduction section 307 instructs the optical disc drive 331 to reproduce data.

An allocated area memory 308 temporarily stores positional information of the recordable area which is found by the unallocated area searching section 303.

A file structure memory 309 temporarily stores the file management information in the buffer memories.

A bit map memory 310 is used to reduce the number of times the disc is accessed by storing a space bit map for the file system managing open areas.

A recording buffer memory 311 and a reproduction buffer memory 312 correspond to the recording buffer 62 and the reproduction buffer 63 of the simultaneous recording and reproduction model, respectively. These buffer memories have a size which is greater than or equal to the size calculated based on the condition for simultaneous recording and reproduction.

Figure 4:
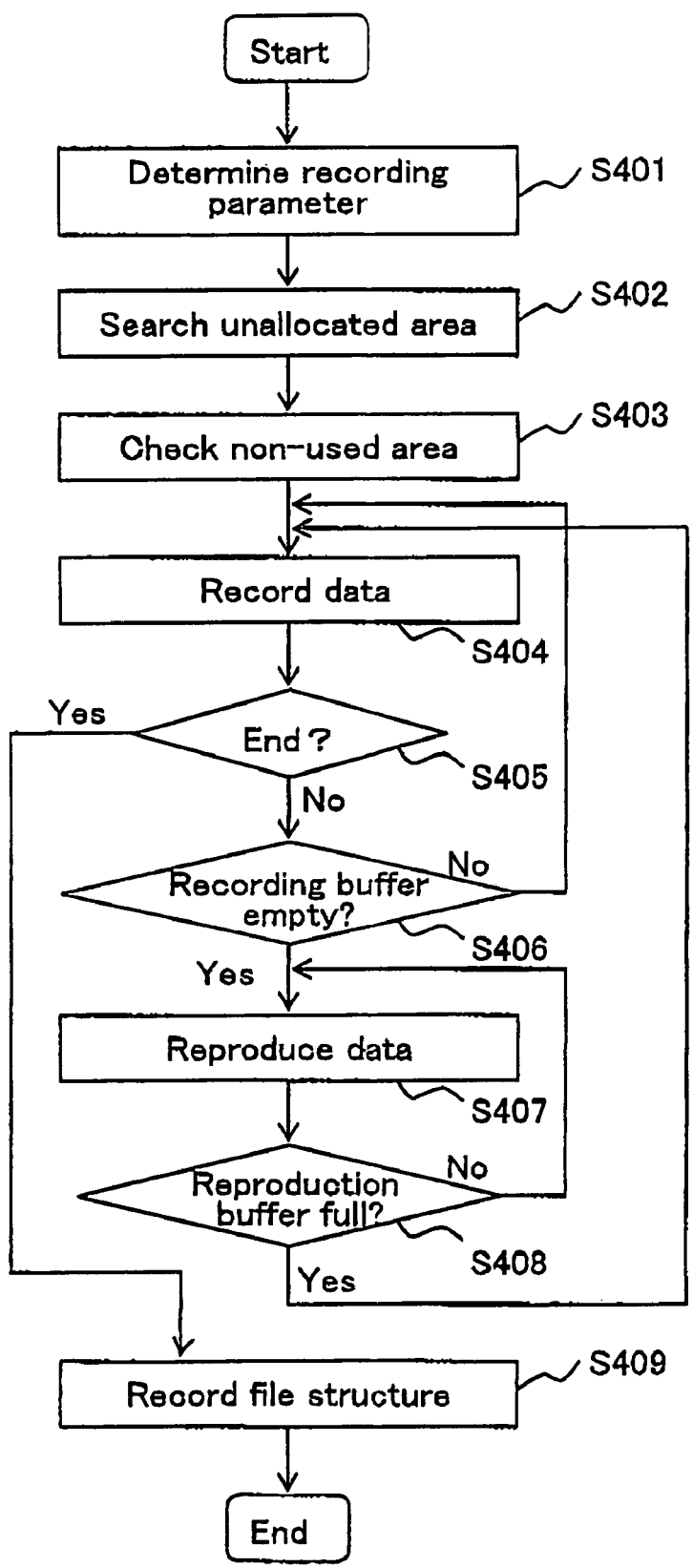
FIG. 4 is a diagram showing a procedure of a method for simultaneous recording and reproduction according to the present invention.

FIG. 4 is a diagram showing a procedure of a method for simultaneous recording and reproduction according to an embodiment of the present invention.

The user uses the input section 332 to input an instruction for simultaneous recording and reproduction to the information recording and reproduction apparatus. In response to the instruction for simultaneous recording and reproduction, the minimum size Y of the recording/reproduction area is determined. The method for obtaining the minimum size Y of the recording/reproduction area is as described with reference to FIG. 1 and FIG. 2. When recording a specific program such as a movie or the like, the user sets the recording time. In this manner, a recording parameter is determined (step S401).

The unallocated area searching section 303 searches for an unallocated area having a size which is greater than or equal to the minimum size Y of the recording/reproduction area obtained in step S401 based on the data stored in the bit map memory 310. When the user sets the recording time, the unallocated area searching section 303 performs a search for unallocated areas until the sum of the sizes of the unallocated areas is greater than or equal to the product of the maximum rate and the recording time, and allocates at least one unallocated area as an area in which real time data is to be recorded (step S402).

The non-used area searching section 304 uses a window or a scale for each of the unallocated areas searched in step S402 to select one or more unallocated areas satisfying the condition for the simultaneous recording and reproduction regarding the size of the non-used area within the unallocated areas. The location information of the selected unallocated areas is stored in the allocated area memory 308 (step S403). As a result, each of at least one area allocated as the area in which real time data is to be recorded has a size which is grater than or equal to Y, and the non-used area included in each of the at least one area has a size which is less than or equal to a predetermined size. Thus, the condition for simultaneous recording and reproduction can be satisfied.

The data recording section 306 instructs the optical disc drive 331 to record the real time data accumulated in the recording buffer memory 311 on the optical disc, and transfers the real time data to be recorded to the optical disc drive 331 (step S404).

In the embodiment shown in FIG. 1, the real time data is recorded from the middle of the recording/reproduction area 101 in the recording operation W11. When it is determined that the recording operation is to be continued in step S406 described below, the real time data is recorded from the start of the recording/reproduction area 102 in the recording operation W12 after the access operation A11. This is because the recording/reproduction area 101 and the recording/reproduction area 102 are located separately.

When the user uses the input section 332 to input an instruction for terminating recording or reproduction to the information recording and reproduction apparatus, the recording and reproduction switching section 302 terminates the recording operation or the reproduction operation (step S405).

The recording and reproduction switching section 302 determines whether or not the recording buffer memory 311 is empty. When the recording buffer memory 311 is determined to be empty, the recording and reproduction switching section 302 switches the recording operation of the real time data to the reproduction operation of the other real time data. When the recording buffer memory 311 is determined not to be empty, the recording and reproduction switching section 302 continues the recording operation of the real time data (step S406).

In the embodiment shown in FIG. 1, the recording buffer memory 331 becomes empty during the recording operation W12. Thus, the recording operation is switched to the reproduction operation. As a result, the real time data is read from the middle of the recording/reproduction area 103 during the reproduction operation R11 after the access operation A12. The reason why the reproduction is performed from the middle of the recording/reproduction area 103 is that the order of reproduction has been changed by editing.

The reproduction may be started from the top of the recording/reproduction area. In this case, since the size of the recording/reproduction area is greater than or equal to Y, the reproduction operation is switched to the recording operation without performing the access operation A13 to the area 104.

The data reproduction section 307 instructs the optical disc drive 331 to reproduce the real time data from the optical disc and transfers the real time data to be reproduced to the reproduction buffer memory 312 (Step S407).

The recording and reproduction switching section 302 determines whether or not the reproduction buffer memory 312 is full. When the reproduction buffer memory 312 is determined to be full, the recording and reproduction switching section 302 switches the reproduction operation of the real time data to the recording operation of the other real time data. When the reproduction buffer memory 312 is determined not to be full, the recording and reproduction switching section 302 continues the reproduction operation of the real time data (step S408).

In the embodiment shown in FIG. 1, the reproduction buffer memory 312 becomes full during the reproduction operation R12. Thus, the reproduction operation is switched to the recording operation. As a result, the real time data is recorded in the area 105 during the recording operation W13 after the access operation A14. The area 102 and the area 105 are a continuous area and a single recording/reproduction area, respectively. However, the continuity of the area 102 and the area 105 are not shown in FIG. 1 for convenience of explanation.

When recording of all of the data is completed, the file structure processing section 305 records a file entry in order to manage the areas in which real time data is recorded as real time extents (step S409).

In this manner, the recording operation of the real time data and the reproduction operation of the real time data are switched between one another while the data accumulation states in the recording buffer memory and the reproduction buffer memory are checked.

Embodiment 2

Figure 8:
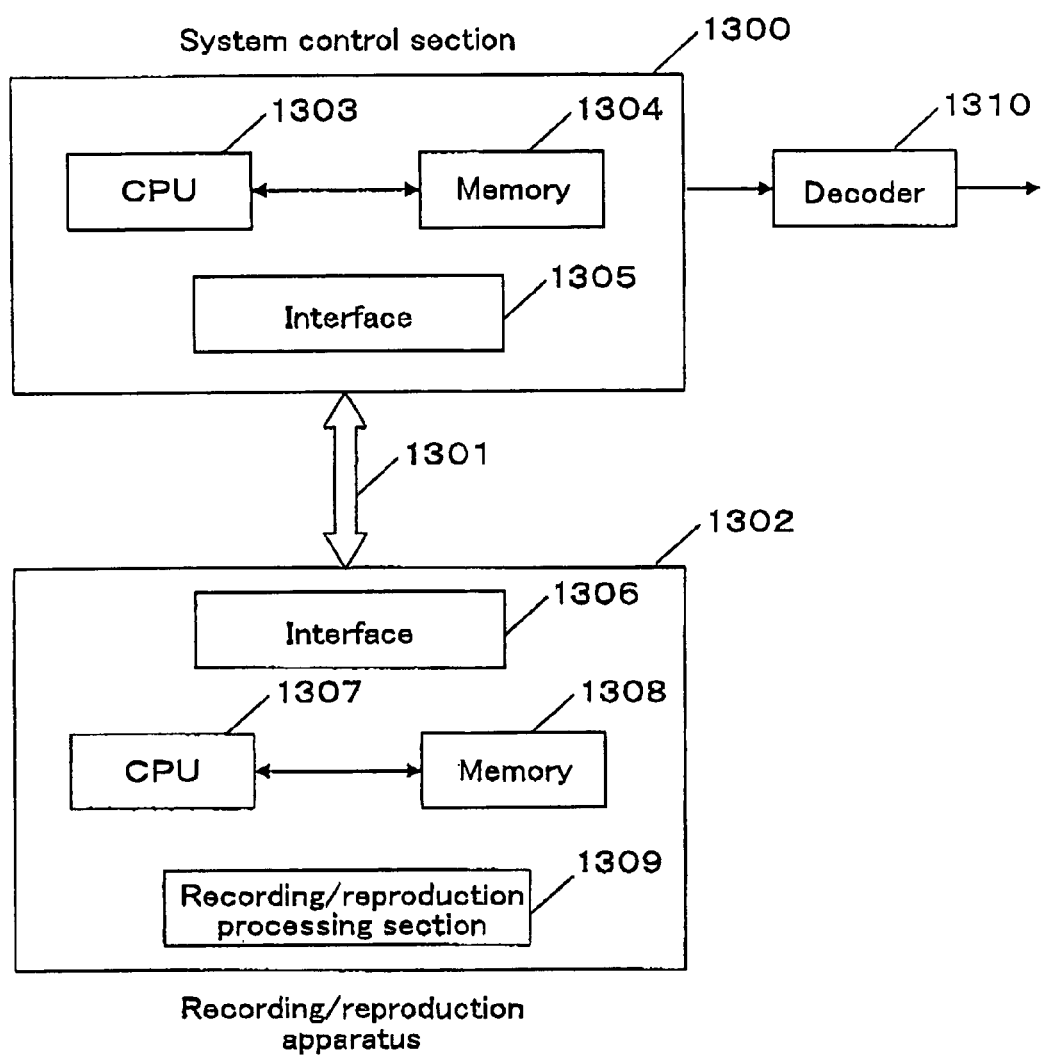
FIG. 8 is a diagram showing a structure of an information recording/reproducing system according to the present invention.

FIG. 8 shows a structure of an information recording/reproduction system according to the present invention. The information recording/reproduction system includes a system control section 1300, a recording/reproduction apparatus 1302, an interface 1301 which passes data or information between the system control section 1300 and the recording/reproduction apparatus 1302, and a decoder 1310 for decoding audio/video data. The system control section 1300 includes a CPU 1303 for performing a calculation process and a memory 1304 for maintaining data when a calculation process is performed. The system control section 1300 can perform a process for recording and/or reproduction according to the present invention. The interface 1301 performs a process for interfacing the system control section 1300 with a recording/reproduction apparatus which supports a recording/reproduction method according to the present invention. Herein, for a computer system, the system control section 1300 is a computer main frame and the recording/reproduction apparatus 1302 is an optical disc drive. For a household video recorder, the system control section 1300 is a system control section with a microcomputer, and the recording/reproduction apparatus 1302 is an optical disc drive dedicated for household use. The system control section 1300 has the functionality of a file system and a device driver which performs the process of a logical layer and controls the recording/reproduction of a file based on an instruction from an application. The recording/reproduction apparatus 1302 has functionality of processing a physical layer for reading out data from an optical disc to transfer to the physical layer, and recording data from the system control section. With the above-described structure, physical properties of an optical disc are processed within a physical layer. From the system control section 1300, an optical disc is provided as one logical address space.

In a continuous reproduction of real time data, factors causing a seek operation of a pickup which may affect the continuous reproduction by interrupting the reading of data are analyzed in view of an architecture of the information recording/reproduction system according to the present invention. The logical factors may be fragmentations of blank areas which may be involved in the rewriting of a file. The logical physical factors may be a defective sector due to fatigue caused by rewriting a disc, or a defective sector due to a scratch, dirt, or the like on the optical disc. It can be seen that logical factors and physical factors are different events which occur independently from one another. Thus, a method in which factors causing a seek operation are classified into physical factors and logical factors and then processed respectively by a physical layer and a logical layer is considered. This method simplifies a way to receive and pass information in the interface 1301. Herein, the fragmentation involved in rewriting a file means that an available blank area is divided into a plurality of areas by recording or erasing a file on an information recording medium according to an instruction by a user. In general, the more times the recording and erasing of a file are repeated, the more divided the blank area is. For example, the blank area is managed with a space bit map in a file system. If data is recorded on an optical disc in which a blank area is separated into a plurality of areas, seek of a pickup among areas on which the data is recorded is necessary.

Figure 9:
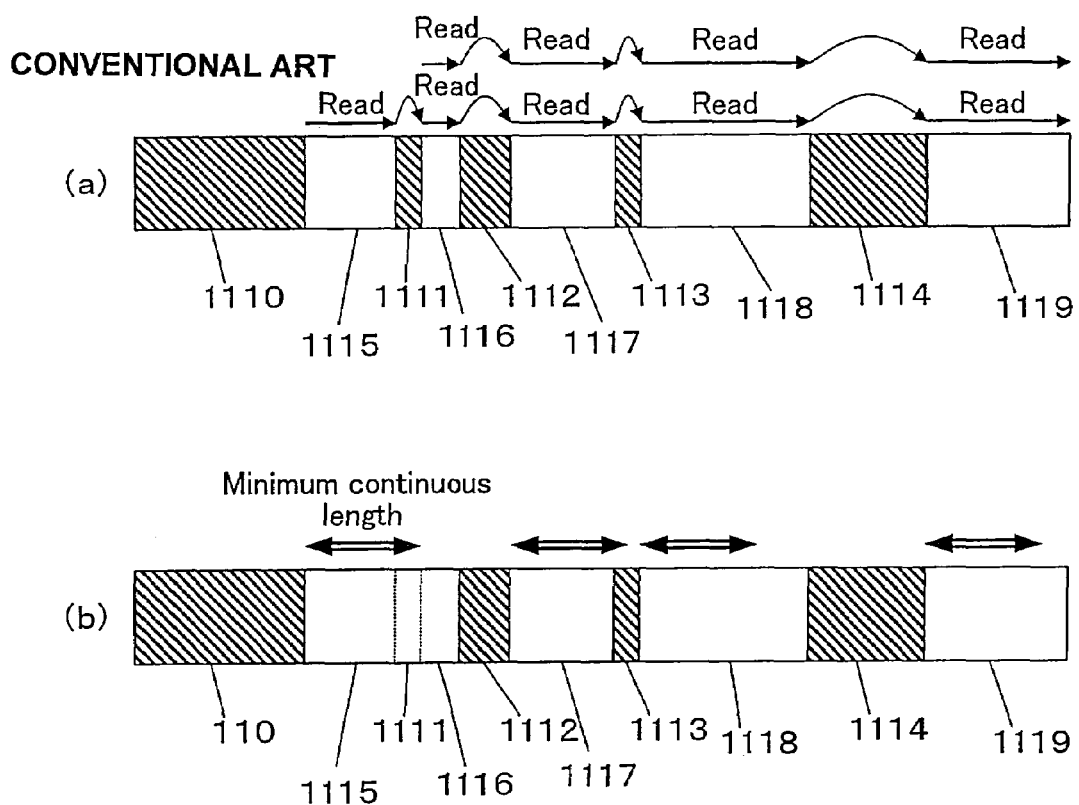
FIG. 9 is a diagram showing areas which allow a continuous reproduction of real time data to be selected from a plurality of unallocated areas according to the present invention.

FIG. 9 is a diagram showing areas which allow a continuous reproduction of real time data to be selected from a plurality of unallocated areas. FIG. 9(a) illustrates a conventional method, and FIG. 9(b) illustrates a method according to the present invention.

In Figure 9(a), references 1110, 1112, 1113, and 1114 denote areas on which valid data is recorded. Reference 1111 denotes a defect area, and references 1135, 1116, 1117, 1118 and 1119 denote unallocated areas available for recording data. In the case where real time data is recorded on an unallocated area, assuming that a model of the reproduction apparatus described with reference to prior art reproduces data from the unallocated area, a change in the amount of data to be stored in a buffer is calculated, and the unallocated area is selected as a recordable area if the data in the buffer does not underflow. However, real time data requires special types of reproduction, such as fast-forward reproduction, and thus, a continuous reproduction starting at a halfway point is required. Thus, it is desirable to calculate the amount of data to be stored in a buffer not only from a header of area 1115, but also from a header of each of the unallocated areas. For example, when calculation is performed from a header of area 1116, since the size of area 1116 is small, underflow of the buffer occurs when area 1115 is being accessed. As the calculation is performed from the headers of a plurality of areas, the calculation becomes complicated.

Herein, the defective area is an area including a defective sector which is not used for recording data. For example, in the case where ECC is performed for a plurality of sectors, an ECC block including a defective sector is a defective area since data is recorded with an ECC block unit. For example, for a DVD disc, 16 blocks form one ECC block. In an optical disc having a defect management mechanism, defective sectors are managed with a defect list.

In FIG. 9(b), areas on which valid data is recorded and defective areas are the same as those shown in FIG. 9(a). However, since defective areas are not managed by a file system, the area 1111 is regarded as an unallocated area. For selecting a recording area which allows continuous reproduction, according to the present invention, a minimum continuous length is predetermined, and an area which is a continuous unallocated area has a length longer than or equal to the minimum continuous length. Thus, an unallocated area is determined uniquely whether or not it is available. The operation is easy and compatibility is high. Herein, the minimum continuous length, which is a reading size which allows data to be consumed, is stored in a buffer in a full seek operation or a seek operation for one half of a distance. This secures continuous reproduction even in the case where the reproduction is started at a halfway point. In the method according to the present invention, areas 1115, 1111, 1116, 1118, and 1119 are selected as areas in which real time data can be recorded.

Figure 10:
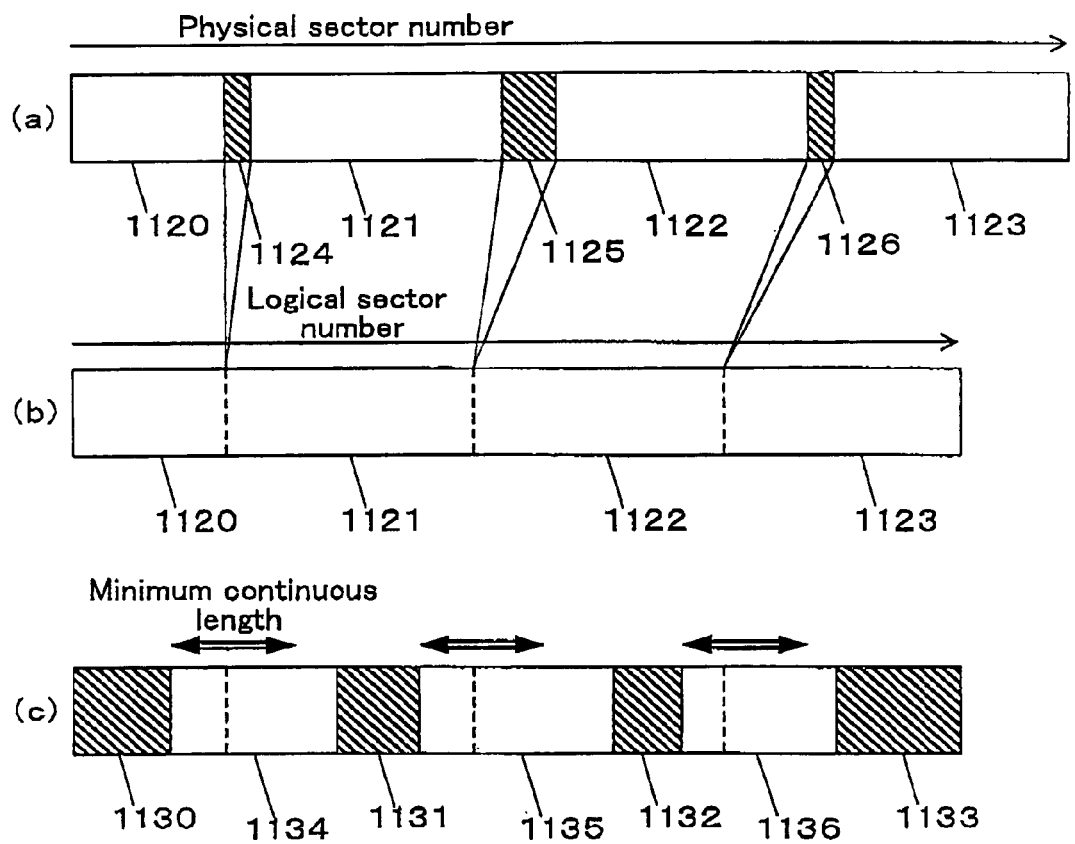
FIG. 10 is a diagram showing an allocation of real time data to an information recording medium subjected to a refreshing process according to the present invention.

FIG. 10 is a diagram showing allocation of real time data to an information recording medium subjected to a refreshing process according to the present invention. FIG. 10(*a*) shows a physical space with a physical address given to each of the physical sectors from the left. Areas 1120, 1121, 1122, and 1123 are areas which do not have defects while areas 1124, 1125, and 1126 which do have defects. FIG. 10(*b*) shows a logical space with a logical address given to each of the logical sectors from the left. The refreshing process is a process for excluding the defect and unavailable areas 1124, 1125, and 1126 from a logical space. Conversion between the physical address and logical address is performed in the recording/reproduction apparatus. For example, the process is performed by certifying for an optical disc. Conversion information for converting from a physical address to a logical address is recorded in, for example, the defect list. FIG. 10(*c*) shows available areas in the logical space. Areas 1130, 1131, 1132, and 1133 are areas in which valid data has already been recorded, and areas 1134, 1135, and 1136 are unallocated areas. In the middle of the unallocated areas 1134, 1135, and 1136, there are defective areas, but these defective areas cannot be seen from a logical layer. Thus, each unallocated area is checked for whether or not it has a minimum continuous length, and an unallocated area longer than or equal to the minimum continuous length is selected as an area on which real time data is to be recorded. In this way, the logical layer can readily position a recording area of real time data without considering a defective area.

Figure 11:
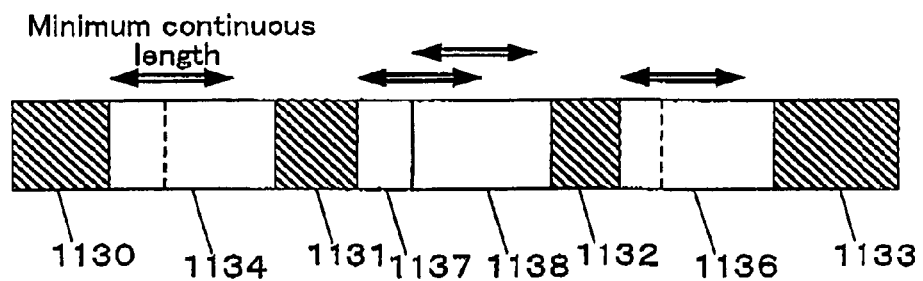
FIG. 11 is a diagram showing an allocation of recording areas for real time data which avoids negative influences due to defective areas on a continuous reproduction according to the present invention.

FIG. 11 is a diagram showing the allocation of recording areas of real time data which avoids a defective area having a large effect on a continuous reproduction if there is one. If the size of the defective area is small, a period in which a pickup cannot reproduce data is short. Thus, the influence on the continuous reproduction of real time data is not large. If the size of the defective area is big, a period in which data cannot be reproduced is long, and it is more probable that underflow of data in a buffer occurs. Thus, the influence on the continuous reproduction of real time data is large. The defective areas in the physical space have the same pattern as those in FIG. 10(*a*). However, the recording/reproduction apparatus determines that the size of defective area 1125 is large and has a large influence on the continuous reproduction, and therefore notifies the system control section. In this way, a file system of the system control section knows that there is an uncontinuous area between areas 1137 and 1138. The file system checks whether areas 1137 and 1138 are longer than or equal to the minimum continuous length, respectively, and determines whether or not to select as an area on which real time data is recorded. In the illustrated example, the size of area 1137 is shorter than the minimum continuous length, and the size of the area 1138 is longer than the minimum continuous length. Thus, area 1137 is not selected, while area 1138 is selected. If a disc has a zone CAV format, such as DVD-RAM disc, it has zone borders. When data is read crossing a zone border, the reading out of data is interrupted at the zone border. Thus, if a disc having a zone CAV format is used, zone borders are notified to the system control section as an uncontinuous area which may largely affect a continuous reproduction of real time data. In this way, as the recording/reproduction apparatus determines whether or not an uncontinuous area affects the reproduction of real time data depending on its size, and notifies the system control section, the system control section can therefore allocate areas in which real time data is to be recorded avoiding an uncontinuous area. Thus, it becomes possible to reproduce real time data without interruption.

According to the present invention, among the factors causing a seek operation of a pickup which may have an influence on a continuous reproduction of real time data, physical factors are further divided into two types of subfactors. These two types of factors are areas which have a large influence and areas which do not have a large influence on a continuous reproduction of real time data when the logical layer allocates areas in which the real time data is to be recorded. The areas having a large influence are referred to as coarse areas. The areas which do not have a large influence are referred to as gap areas. Hereinafter, a method for absorbing the influence on the continuous reproduction of the real time data in the coarse areas will be described.

Figure 12:
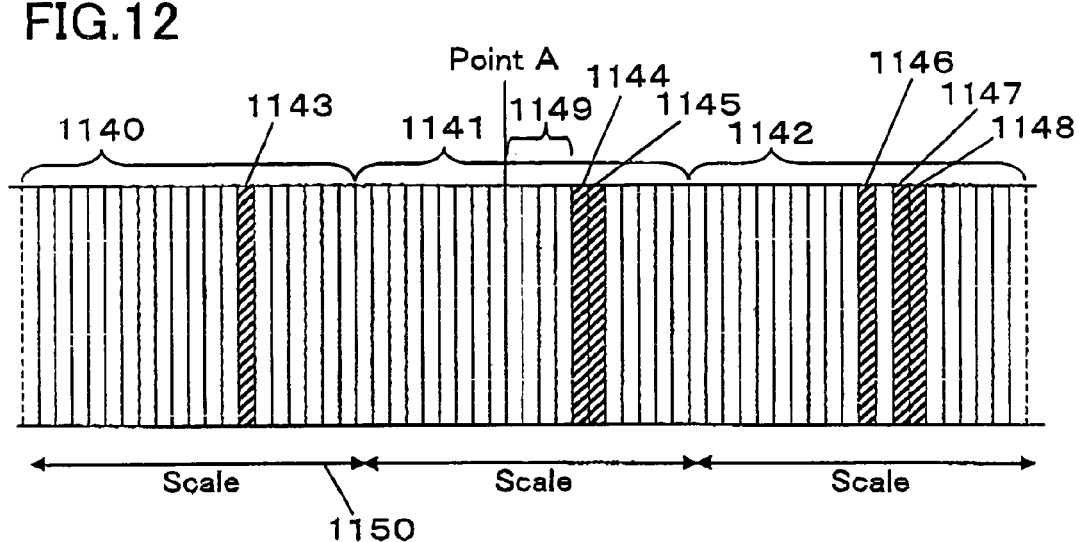
FIG. 12 is a diagram showing a scale for checking defective areas in the physical space according to the present invention.

FIG. 12 shows defective areas in the physical space. Using a predetermined range of the size as a scale, areas having a ratio of an area which is not used for recording real time data such as a defective area in the range of the scale is lower than or equal to a certain value are determined as the coarse areas. Areas 1140, 1141, and 1142 are continuous areas in the physical space and have the same size as that of scale 1150. Areas represented by broken line in each of the areas are physical sectors. Areas 1143, 1144, 1145, 1146, 1147, and 1148 are defective areas. Specific numerical values will be described below. For the sake of simplicity, it is assumed that a scale has the size of 20 sectors, and if the ratio of an area which is not used is 10% or lower, an area which is not used is determined as a coarse area. When scale 1150 is used against area 1140, there is one sector in the area, and area 1143 is determined as a coarse area. Similarly, the scale 1150 is used against areas 1141 and 1142, respectively. Since the ratio of the unused area is 10%, areas 1144 and 1145 are determined as coarse areas and areas 1146, 1147 and 1148 are determined as not being a coarse area (gap areas).

Figure 13:
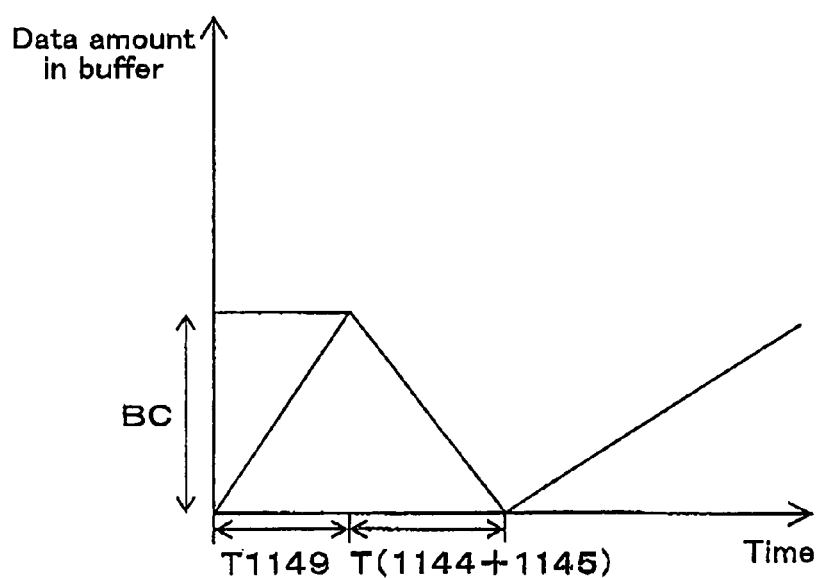
FIG. 13 is a diagram showing a change in the amount of data in an absorption buffer according to the present invention.

FIG. 13 shows a change in the amount of data in an absorption buffer introduced for absorbing access factors which may inhibit a continuous reproduction of real time data, according to the coarse areas of the present invention. This becomes possible by delaying timing to start the transferring of data which is read out from a pickup to a decoder until the data stored in a buffer reaches the amount of data corresponding to access time in the coarse areas. In FIG. 12, when data has to be reproduced from point A, transferring data read out from point A to the decoder is not started until the amount of data in the buffer reaches the amount indicated by BC. In this way, data is stored in the buffer at a reading out rate of the pickup for a time period for the pickup to operate a reading operation from point A to a header of area 1144. Next, data stored in the buffer is transferred to the decoder for time T (1144+1145) for the pickup to access from the header of area 1144 to the end of area 1145. In this way, by delaying the start timing of data transfer to the decoder with respect to start reading data, it becomes possible to absorb the inhibition of the continuous reproduction of the real time data. As described above, by providing the absorption buffer for absorbing an influence of coarse areas which are in the range of a scale at a certain ratio or below, a read start position is not necessarily a header of a scale. Thus, it is not necessary to consider the presence of coarse areas in the logical layer.

A buffer having the same size as the absorption buffer may be provided in the recording/reproduction apparatus. Based on the defect list, the size of a defective area in the range of the scale is known. Thus, it is not necessary to store data corresponding to the size of the absorption buffer. The data transfer to the decoder may be started after the data corresponding to the size of the defective area which actually exists is stored in the buffer.

Next, the size which is allowed as a gap area will be considered. There are three points which should be considered: the use conditions of the user; the physical format; and the buffer size.

In view of the use conditions, in the case of a DVD-RAM disc, when the value is set to about 6% no practical problem has occurred, although this depends on the situation. With respect to the use conditions of the user, this value can be employed.

In view of the performance of the physical format, if there is a defective area is on a disc, the value can be determined based on manageable performance of the defect list. For example, the defect management list may be determined based on a ratio of the size of the defective areas which can be registered to the defect management list and the capacity of the disc. In general, the value is 5%.

The value may be determined by introducing the absorption buffer with respect to the buffer size such that a burden of the apparatus does not become large. For example, one tenth of the buffer size may be allocated for the absorption buffer. If the size of the absorption buffer becomes large, the start time of decoding is delayed. Thus, it is effective to suppress the time period so as not to bother the user. For example, the ratio of the coarse areas may be determined by determining the size of the absorption buffer such that the transfer delay time to the decoder is 100 msec or less. Further, in view of the restriction of the design of the apparatus, it is desired to suppress the size of the absorption buffer to 300 KB or less.

Herein, by suppressing the scale to be shorter than the minimum continuous length, the size of the absorption buffer can be made small. The allowable size of the coarse areas in the scale is proportional to the scale. Accordingly, as the scale becomes smaller, the size of the absorption buffer can be made smaller. On the other hand, an allowable size of the coarse areas in the scale is preferably a continuous area which is larger than or equal to a certain size. For example, there may be a case where a few ECCs are defective continuously. Thus, by providing the scale having the size which is tolerant to coarse areas which continue for a few ECCs, such a case can be addressed.

Figure 14:
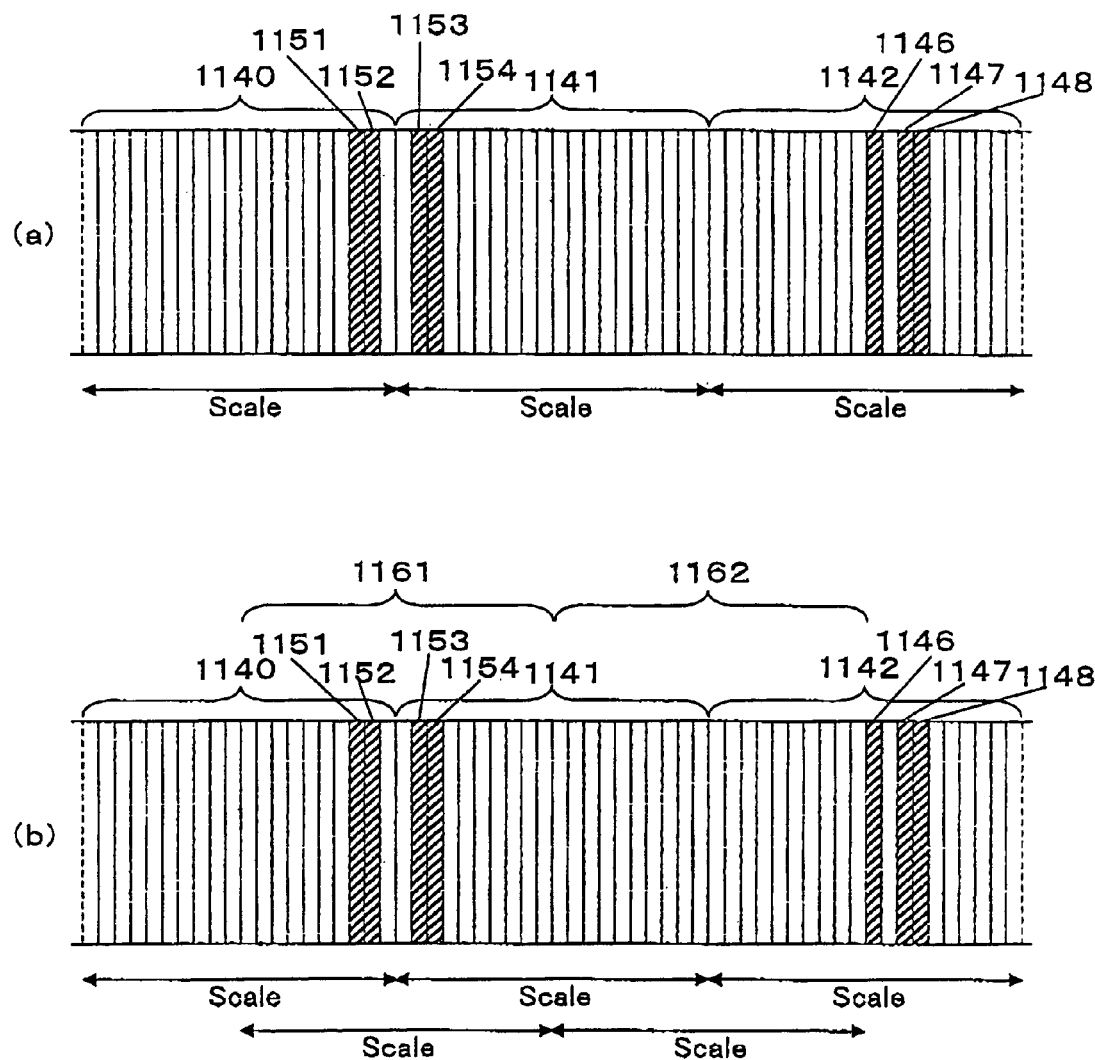
FIG. 14 to a diagram showing an improved method for avoiding an imbalance of coarse areas according to the present invention.

Next, a method for determining the coarse areas will be described. As already explained with reference to FIG. 12, the size of the scale may be predetermined and the areas may be checked in the interval which is the same as the scale. FIG. 14(a) is a diagram showing an example in which coarse areas are provided at the end of area 1140 of FIG. 12 and the coarse areas are provided at the header of area 1141. Areas 1151, 1152, 1153, 1154, 1146, 1147, and 1148 are defective areas. It is preferable that the size of the absorption buffer is determined such that it will also be effective to such a case. In this case, an area twice as large as the allowable coarse areas in the scale should be considered as the size of the buffer.

FIG. 14(b) shows an improved method for avoiding imbalance of the coarse areas. For judging the coarse areas, the scale is moved for every one half of the distance of the scale to check whether the tolerable unused area in the scale has a size smaller than or equal to the predetermined size. Specifically, in addition to areas 1140, 1141, and 1142, areas 1161 and 1162 are determined whether or not they are coarse areas with respect to the scale. In this way, from the header of area 1151 to the end of area 1154, it is determined to be a gap area, and the imbalance of coarse areas can be avoided.

Next, the method for addressing a defective area generated after refreshing will be described.

Figure 15:
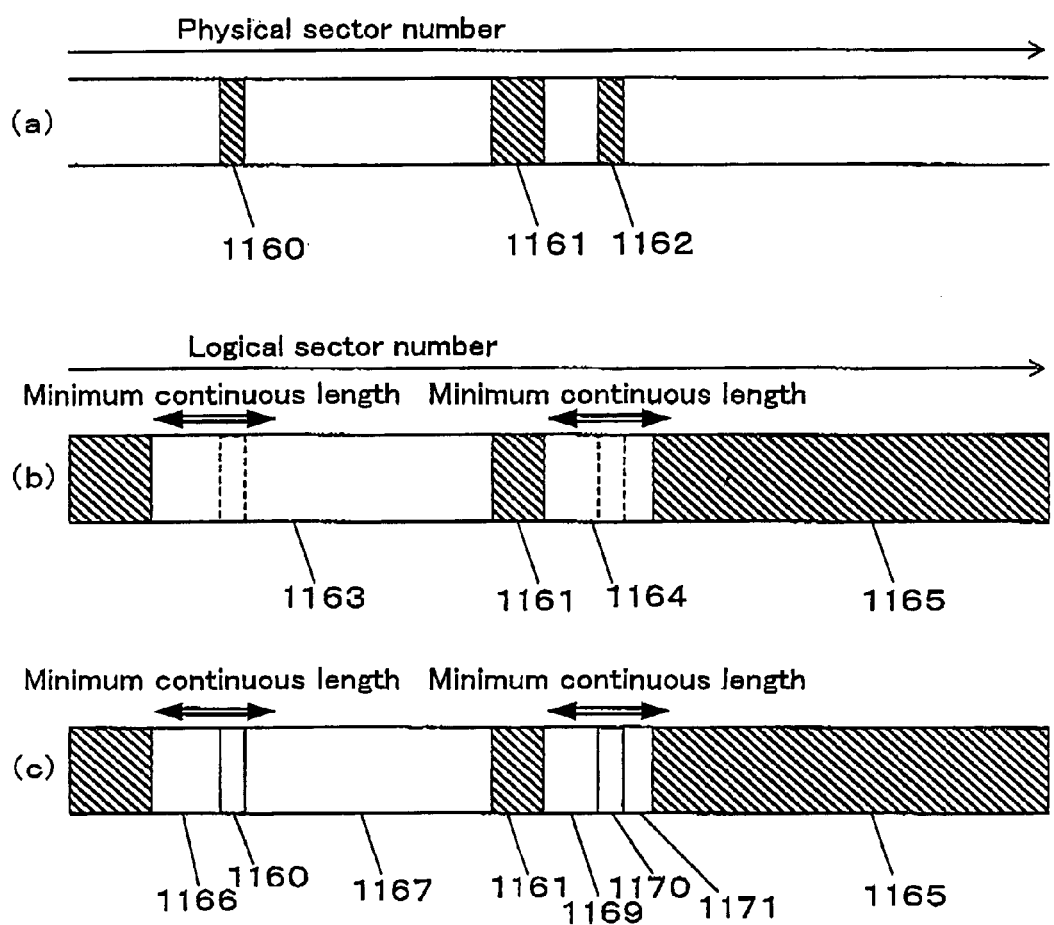
FIG. 15 is a diagram illustrating the recording/reproduction apparatus recording the data which avoids the coarse areas in the logical space according to the present invention.

FIG. 15(a) shows defective areas 1160, 1161, and 1162 generated after refreshing. The defective areas detected after the refreshing process are a part of the logical space. The recording/reproduction system determines a defective area generated after refreshing whether or not it is a gap area by using a method described with reference to FIG. 14. In the example shown in FIG. 15(a), the recording/reproduction apparatus notifies the system control section that area 1161 is a gap area. FIG. 15(b) shows a logical space corresponding to a physical space of FIG. 15(a). Logically valid data is stored in the area in front of area 1163 and the area following area 1164. Area 1161 is part of the logical space, but it is shown to be a gap area. Thus, areas 1163 and 1164 are determined to be continuous unused areas, respectively. The system control section checks whether unused areas 1163 and 1164 have the size larger than or equal to the minimum continuous length. In FIG. 15(b), area 1163 is selected as an area in which real time data can be recorded. Herein, although area 1160 is a defective area, the recording/reproduction apparatus does not notify the system control section of this. Thus, the system control section instructs the recording of data to this area. In FIG. 15(c), the recording/reproduction apparatus notifies the location of the coarse areas to the system control section. The method is the same on the point that the system control section selects whether or not it is possible to record real time data to the area. However, the system control section can exclude the coarse area portion from the selected areas so as not to record data on the coarse areas, and determines areas 1166 and 1167 as the recording areas that avoid the coarse areas.

Figure 7:
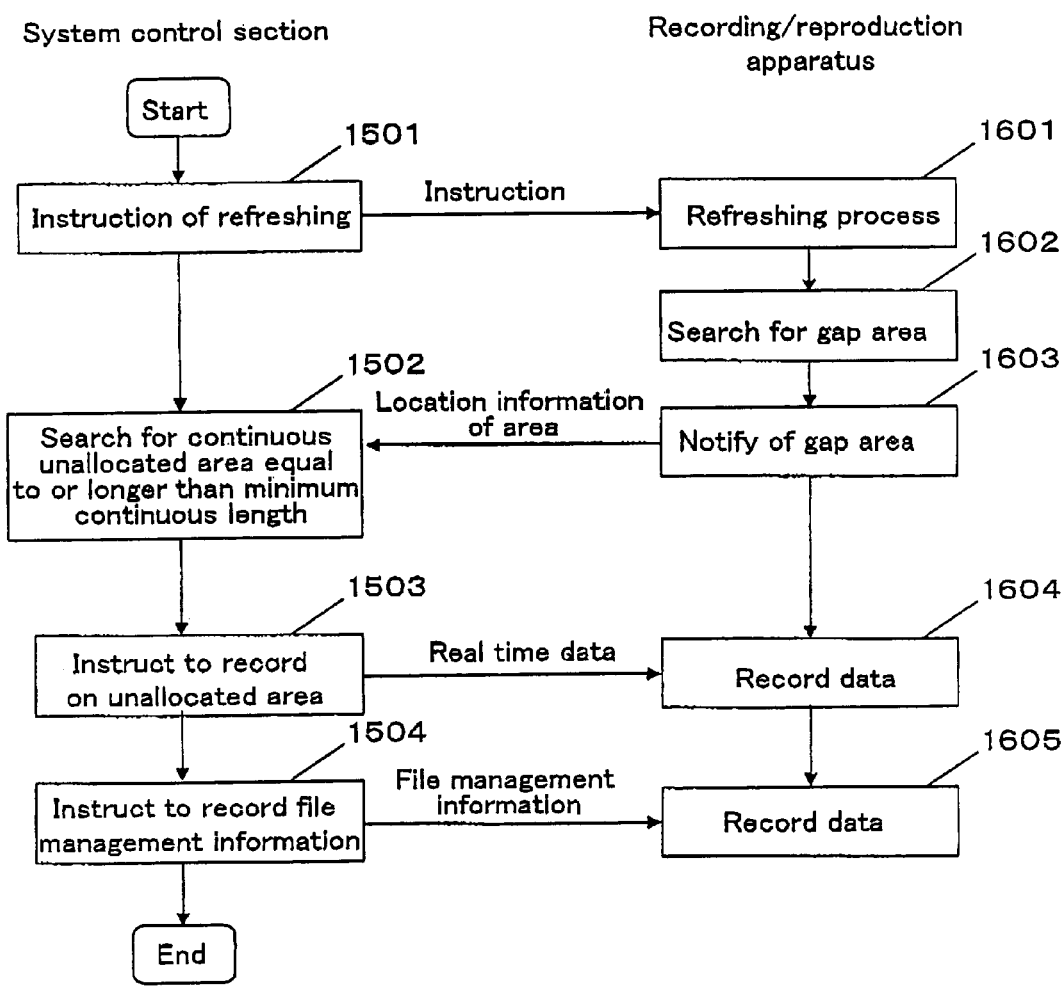
FIG. 7 is a diagram showing a refreshing process, a notification method for notifying the location information of a gap area of the recording/reproduction apparatus, and a selection method for selecting an unallocated area for recording real time data of the system control section according to the present invention.

Next, the method of the above-mentioned processing apparatus will be described with reference to a flow chart. FIG. 7 is a diagram showing a refreshing process and a method of notifying the location information of the gap area of a recording/reproduction apparatus and a selection method of an unallocated area for recording real time data of the system control section.

When there is an area which cannot be used due to a defective area in the logical space, and the user thinks that the recording quality of the video data may deteriorate, the system control section instructs the recording/reproduction apparatus to perform the refreshing process (step 1501).

Upon the refreshing instruction, the recording/reproduction apparatus excludes areas which cannot be used due to defective areas from the logical space (step 1601).

Then, the recording/reproduction apparatus searches for a gap area in the physical space (step 1602), and notifies the location information of gap areas which was found through a search to the system control section (step 1603).

The system control section obtains the location information of gap areas. Based on blank area information managed by the file system, the system control section checks each of the continuous unallocated areas to determined whether or not they have a size larger than or equal to the predetermined minimum continuous length. The unallocated areas having a size larger than or equal to the minimum continuous length are secured as areas in which real time data is to be recorded (step 1502).

The system control section instructs the recording/reproduction apparatus to record real time data in the secured unallocated areas (step 1503).

The recording/reproduction apparatus records the real time data in the indicated areas (step 1604).

After the real time data is recorded, the system control section instructs the recording/reproduction apparatus to record file management information for managing the real time data as a file (step 1504).

The recording/reproduction apparatus records file management information in the indicated area (step 1605).

Herein, it is not necessary that the refreshing process is always performed prior to recording. It is effective to use a refreshing process when the information recording medium is used in various circumstances and the number of defective areas increases. Notification of the location information of the gap area may be performed after the refreshing process is performed, or after loading the information recording medium to the recording/reproduction apparatus. It is not necessary to perform notification every time data is recorded.

Search for the continuous unallocated area having a size larger than or equal to the minimum continuous length may be performed prior to the recording of the file. Alternatively, it may be previously searched for in a range larger than that of the data to be recorded, and may be performed when the searched unallocated areas are not sufficient.

Figure 16:
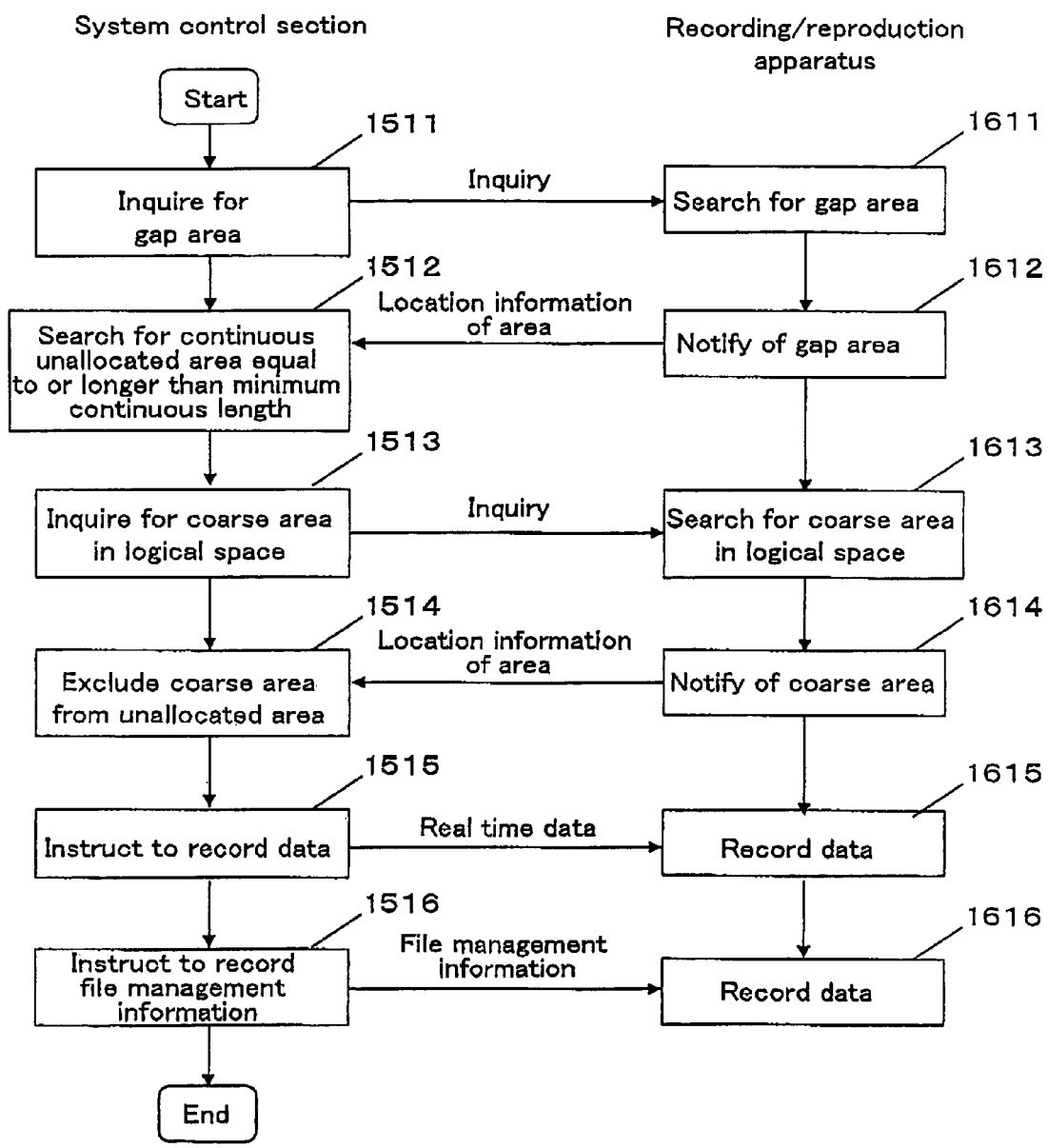
FIG. 16 is a diagram showing a method for the recording/reproduction apparatus to notify the location information on the gap and coarse areas and a method for the system control section to select a recording area of the real time data from unallocated areas of the system control section and determine the recording area.

FIG. 16 shows a method for the recording/reproduction apparatus to notify the location information on the gap and coarse areas and a method for the system control section to select a recording area of the real time data from unallocated areas of the system control section and determine the recording area.

The system control section inquires the recording/reproduction apparatus for the presence of a gap area and the location information thereof (step 1511).

The recording/reproduction apparatus checks whether the defective area in the physical space is a gap area by using the scale (step 1611), and notifies the location information of the found gap area to the system control area (step 1612).

The system control section obtains the location information of the gap area. Based on the blank area information managed by the file system, the system control section checks each of the continuous unallocated areas to determine whether or not they have a size larger than or equal to the predetermined minimum continuous length. The system control section secures the unallocated areas having the size larger than or equal to as areas for recording real time data (step 1512).

Then, the system control section requests the recording/reproduction apparatus for the presence of a coarse area and the location information thereof (step 1513).

The recording/reproduction apparatus searches for a coarse area in the logical space (step 1613), and notifies the system control section of the location information of the found coarse area (step 1614).

The system control section excludes coarse areas among the areas for recording real time data which are secured in step 1512 from the recording areas and allocates areas in which the real time data is to be recorded (step 1514).

The system control section instructs the recording/reproduction apparatus to record the real time data to the allocated areas in which the real time data is to be recorded (step 1515).

The recording/reproduction apparatus records the real time data in the indicated areas (step 1615).

After the real time data is recorded, the system control section instructs the recording/reproduction apparatus to record file management information for managing the real time data as a file (step 1516).

The recording/reproduction apparatus records the file management information in the indicated area (step 1616).

Herein, the gap area may not only be searched with respect to defective areas which exist in the physical space and cannot be seen from the logical space, but also with respect to defective areas which exist in the logical space. There may be a case in which a defective area is detected when data is recorded using a defect management mechanism of the recording/reproduction apparatus. Even when only data is reproduced, by an error detection using ECC, it is clear that the area has a defect when this reproduction data is determined to be incorrect. Thus, when data is recorded/reproduced on/from an area in which real time data can be recorded, there is a possibility that a new defective area is detected. In such a case, request for a gap area and location information of a coarse area on the logical space are preferable.

Figure 17:
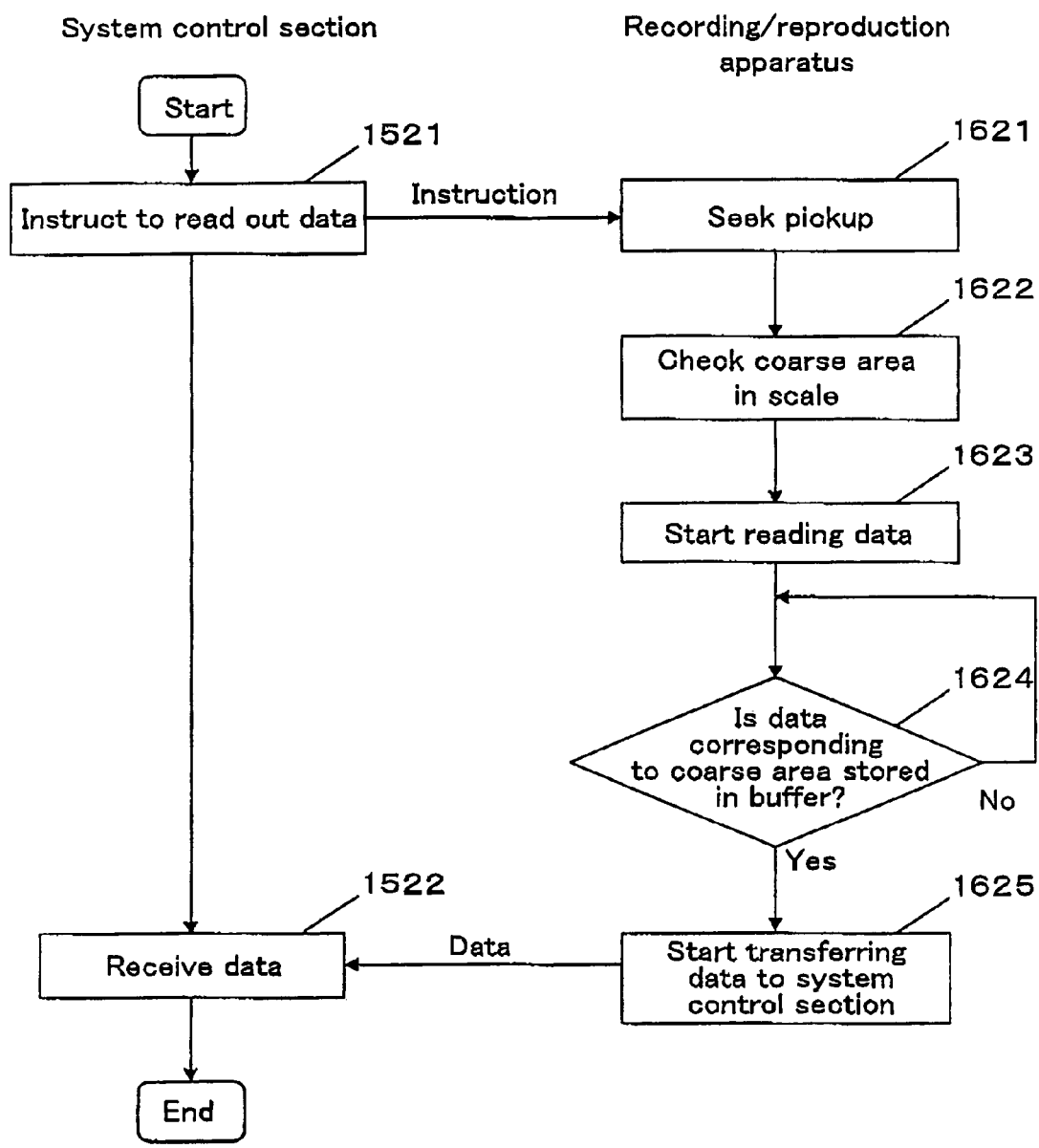
FIG. 17 is a diagram showing a method of buffering data using the absorption buffer according to the present invention.

FIG. 17 shows a method of buffering data using the absorption buffer.

The system control section instructs the recording/reproduction apparatus to read out data together with location information data to be read for reading out data (step 1521).

The recording/reproduction apparatus seeks the pickup at the indicated position (step 1621). The recording/reproduction apparatus checks the size of the coarse areas in the range of the scale which includes a sector in which reading is started (step 1622). The recording/reproduction apparatus starts reading out data using a memory of the recording/reproduction apparatus as a buffer (step 1623).

The recording/reproduction apparatus stores the read out data in the buffer until the data having an amount corresponding to the coarse areas is stored (step 1624). When the predetermined amount of data is stored in the buffer, the recording/reproduction apparatus starts transferring data to the system control section (step 1625).

The system control section receives the read out data (step 1522).

The minimum continuous length which is used as a criterion when allocating the areas to which the real time data is to be recorded may be a value which the system control section originally has. Alternately, it may be calculated in consideration of the data rate of the real time data recorded by an application which records the real time data, and/or the reading out rate of an optical disc drive, and may be instructed to the system control section.

Further, a continuous area in which the real time data is recorded to can be referred to as a real time extent. In the file management information which manages the location information thereof, even though the areas in which the real time data is recorded is continuous in the logical space, the real time extent may be divided at a gap area if there is one in the continuous area, and can be managed as file management information. In this way, the logically continuous areas are managed as two real time extents. Thus, gap areas can be known from the file management information without requesting this information from recording/reproduction apparatus.

The recording method according to the present invention allows for the optimization of a procedure that determine the locations upon the recording of the real time data by grouping the factors related to areas in which the pickup performs a seek operation into factors at the physical layer and factors at the logical layer and to address each of the factors at their respective layers. Thus, the recording procedure becomes simple and the compatibility improves. Further, the refreshing of the information recording medium is performed so as to exclude the defective areas from the logical space in the range with a less influence on the continuous reproduction and a part of the buffer memory is used for an area which cannot be seen from the logical layer. Accordingly, it is not necessary to consider a defect on the information recording medium on the logical layer. Further, if there is a defective area having a large influence on the continuous reproduction, the location information is sent to the logical layer so that the logical layer can readily determine the locations that avoid such an area.

According to Embodiment 2 of the present invention, the procedure for determining the locations can be optimized when the real time data is recorded. Thus, the method of the present invention can be applied to the recording of video data using a personal computer and a DVD-RAM drive, and the effects of the present invention can be achieved. Further, the effects of the present invention can also be achieved when the method is applied to a future personal computer optical disc drive using a blue laser.

According to the present invention, in a simultaneous recording and reproduction in which switching timing between recording and reproduction is switched in accordance with the amount of data stored in the buffer memory, an unused area may be included in the recording and reproduction area to/from which data is recorded/reproduced. Thus, it is useful to use the present invention in the information recording medium which has a defective block or the like.

Particularly, as the technical innovation in the fields of an optical laser and a physical medium proceeds, an optical disc is becoming more dense. As the optical disc becomes more dense, repeatability of recording tends to decrease. For example, regarding MO or DVD-RAM for data, the properties of the physical media have been designed to be resistant to 100,000 rewrites. However, a medium which is resistant to only about 1,000 rewrites is studied now. As the recording/reproduction of data is repeated, more defective blocks are generated. The present invention can be applied to such an optical disc with a small number of rewrites.

According to the recording method of the present invention, the skip condition is clearly defined in the simultaneous recording and reproduction. This enables reproducing real time data recorded on an information recording medium while avoiding any defective blocks, while recording real time data while avoiding any defective block, in the unallocated areas. Further, by defining the skip condition for simultaneous recording and reproduction as a format, it is possible to provide an information recording medium capable of performing simultaneous recording and reproduction without depending on the types and the makers of the video recorders.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A simultaneous recording and reproduction method for recording a first real time data in an information recording medium while reproducing a second real time data recorded in the information recording medium, comprising the steps of:
   searching for unallocated areas on the information recording medium and allocating at least one unallocated area, wherein the at least one unallocated area has a size which is greater than or equal to a minimum size Y, as an area in which the first real time data is to be recorded;
   selecting at least one area in which the selected at least one area includes a non-used area having a size which is less than or equal to a predetermined size of L from among the allocated at least one area, wherein the non-used area is an area which is not used during the recording operation or the reproduction operation, L denotes the size of non-used area which is allowed within a scale having a size which is less than or equal to 1/N of the minimum size Y and N denotes an integer which is greater than or equal to two;
   recording the first real time data in the selected at least one area; and
   reading the second real time data from at least one area in which the second real time data has been recorded, whereby each of the at least one area has a size which is greater than or equal to the minimum size Y,
   wherein the minimum size Y is determined to enable the simultaneous recording and reproduction, even if an (N+1) number of non-used areas each having a size of L exists within two adjacent areas where data is to be recorded during the recording operations immediately before and immediately after an access operation, or even if the (N+1) number of non-used areas having a size of L exists within two adjacent areas where data is to be read during the reproduction operations immediately before and immediately after an access operation.

2. An information recoding and reproduction apparatus for recording a first real time data in an information recording medium while reproducing a second real time data recorded in the information recording medium, comprising:
   means for searching for unallocated areas on the information recording medium and allocating at least one unallocated area, wherein the at least one unallocated area has a size which is greater than or equal to a minimum size Y, as an area in which the first real time data is to be recorded;
   means for selecting at least one area in which the selected at least one area includes a non-used area having a size which is less than or equal to a predetermined size of L from among the allocated at least one area, wherein the non-used area is an area which is not used during the recording operation or the reproduction operation, L denotes the size of non-used area which is allowed within a scale having a size which is less than or equal to 1/N of the minimum size Y and N denotes an integer which is greater than or equal to two;
   means for recording the first real time data in the selected at least one area; and
   means for reading the second real time data from at least one area in which the second real time data has been recorded, whereby each of the at least one area has a size which is greater than or equal to the minimum size Y,
   wherein the minimum size Y is determined to enable the simultaneous recording and reproduction, even if an (N+1) number of non-used areas each having a size of L exists within two adjacent areas where data is to be recorded during the recording operations immediately before and immediately after an access operation, or even if the (N+1) number of non-used areas having a size of L exists within two adjacent areas where data is to be read during the reproduction operations immediately before and immediately after an access operation.

3. An information recording medium having at least one area allocated as an area in which real time data is to be recorded,
   wherein the at least one area has a size which is greater than or equal to a minimum size Y; and
   wherein the minimum size Y is determined to enable the simultaneous recording and reproduction, even if an (N+1) number of non-used areas each having a predetermined size of L exists within two adjacent areas where data is to be recorded during the recording operations immediately before and immediately after an access operation, or even if the (N+1) number of non-used areas having a size of L exists within two adjacent areas where data is to be read during the reproduction operations immediately before and immediately after an access operation, the non-used areas are areas which are not used during the recording operation or the reproduction operation, L denotes the size of non-used area which is allowed within a scale having a size which is less than or equal to 1/N of the minimum size Y and N denotes an integer which is greater than or equal to two.

* * * * *

UNITED STATES PATENT AND TRADEMARK OFFICE
CERTIFICATE OF CORRECTION

PATENT NO. : 7,602,686 B2 Page 1 of 1
APPLICATION NO. : 10/966016
DATED : October 13, 2009
INVENTOR(S) : Yoshiho Gotoh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Fifth Day of October, 2010

David J. Kappos
*Director of the United States Patent and Trademark Office*